United States Patent [19]
Peckham et al.

[11] Patent Number: 5,516,408
[45] Date of Patent: *May 14, 1996

[54] PROCESS FOR MAKING COPPER WIRE

[75] Inventors: Peter Peckham, Concord, Ohio;
Sharon K. Young; Bradford A. Mills, both of Tucson, Ariz.; Adam G. Bay, Chesterland, Ohio; Michael A. Eamon, Tucson, Ariz.; Roger N. Wright, Rexford, N.Y.; Stephen J. Kohut, Chandler, Ariz.

[73] Assignees: Magma Copper Company, Tucson, Ariz.; Gould Electronics Inc., Eastlake, Ohio

[ * ] Notice: The term of this patent shall not extend beyond the expiration date of Pat. No. 5,366,612.

[21] Appl. No.: 329,235

[22] Filed: Oct. 26, 1994

Related U.S. Application Data

[63] Continuation-in-part of Ser. No. 49,176, Apr. 19, 1993, Pat. No. 5,366,612, and a continuation-in-part of Ser. No. 287,703, Aug. 9, 1994, Pat. No. 5,458,746, which is a continuation of Ser. No. 49,160, Apr. 19, 1993, abandoned.

[51] Int. Cl.⁶ .............................. C25C 1/12; C25D 1/04; C25D 21/18; C25D 7/06
[52] U.S. Cl. .......................... 205/580; 205/77; 205/101; 205/138; 205/581; 205/582; 205/583
[58] Field of Search .................... 204/106, 108; 205/76, 77, 101, 138

[56] References Cited

U.S. PATENT DOCUMENTS

| | | | |
|---|---|---|---|
| 1,058,048 | 4/1913 | Gibbs | 205/138 |
| 1,959,376 | 5/1934 | Lucas | 264/1 |
| 2,053,222 | 9/1936 | Lucas | 204/5 |
| 2,074,713 | 8/1937 | Dechene et al. | 29/33 |
| 3,148,130 | 9/1964 | Brace et al. | 204/96 |

(List continued on next page.)

FOREIGN PATENT DOCUMENTS 496513   7/1992   European Pat. Off. .

OTHER PUBLICATIONS

Townson et al., "The Solvent Extraction of Copper—A Perspective", Minning Journal Limited. (No Date).
Encheu et al., "Production of Copper Powder by the Method of Electrolytic Extraction Using Reverse Current", Sov. Powder Met. & Met. Ceramics, vol. 13, No. 9 (Sep. 1974), pp. 764–766.

(List continued on next page.)

Primary Examiner—John Niebling
Assistant Examiner—Edna Wong
Attorney, Agent, or Firm—Michael A. Centanni

[57] ABSTRACT

This invention relates to a process for making copper wire directly from a copper-bearing material, comprising: (A) contacting said copper-beating material with an effective amount of at least one aqueous leaching solution to dissolve copper ions into said leaching solution and form a copper-rich aqueous leaching solution; (B) contacting said copper-rich aqueous leaching solution with an effective amount of at least one water-insoluble extractant to transfer copper ions from said copper-rich aqueous leaching solution to said extractant to form a copper-rich extractant and a copper-depleted aqueous leaching solution; (C) separating said copper-rich extractant from said copper-depleted aqueous leaching solution; (D) contacting said copper-rich extractant with an effective amount of at least one aqueous stripping solution to transfer copper ions from said extractant to said stripping solution to form a copper-rich stripping solution and a copper-depleted extractant; (E) separating said copper-rich stripping solution from said copper-depleted extractant; (F) flowing said copper-rich stripping solution between an anode and a cathode, and applying an effective amount of voltage across said anode and said cathode to deposit copper on said cathode; (G) removing said copper from said cathode; and (H) converting said removed copper from (G) to copper wire at a temperature below the melting point of said copper.

44 Claims, 3 Drawing Sheets

U.S. PATENT DOCUMENTS

| | | | |
|---|---|---|---|
| 3,163,591 | 12/1964 | Chambers | 204/108 |
| 3,282,682 | 11/1966 | Harlan | 75/117 |
| 3,535,218 | 10/1970 | Brown et al. | 204/108 |
| 3,556,957 | 1/1971 | Toledo et al. | 204/32 |
| 3,616,277 | 10/1971 | Adamson et al. | 204/10 |
| 3,661,740 | 5/1972 | Brace et al. | 204/96 |
| 3,681,056 | 8/1972 | Lyon et al. | 75/108 |
| 3,683,662 | 8/1972 | Dechene et al. | 77/235 |
| 3,757,410 | 9/1973 | Roberts | 29/420.5 |
| 3,811,309 | 5/1974 | Nordstrom | 72/235 |
| 3,844,763 | 10/1974 | Burkin | 75/0.59 |
| 3,880,647 | 4/1975 | Tipman | 75/364 |
| 3,925,472 | 12/1975 | Swanson | 564/266 |
| 3,929,610 | 12/1975 | Wang | 204/13 |
| 3,939,745 | 2/1976 | Weeks et al. | 83/425.3 |
| 3,951,649 | 4/1976 | Kieswetter, Jr. et al. | 75/373 |
| 4,007,617 | 2/1977 | Falk et al. | 72/234 |
| 4,018,073 | 4/1977 | Bartram et al. | 72/199 |
| 4,023,964 | 5/1977 | DeMatthe et al. | 75/101 R |
| 4,028,199 | 6/1977 | Holland | 204/10 |
| 4,030,990 | 6/1977 | Piret et al. | 204/108 |
| 4,037,445 | 7/1977 | Winter et al. | 72/60 |
| 4,039,404 | 8/1977 | Richards et al. | 204/108 |
| 4,069,119 | 1/1978 | Wong | 204/106 |
| 4,083,758 | 4/1978 | Hamby et al. | 206/106 |
| 4,133,746 | 1/1979 | Dopson | 209/1 |
| 4,142,952 | 3/1979 | Dalton | 204/106 |
| 4,150,976 | 4/1979 | Dain | 75/117 |
| 4,193,846 | 3/1980 | Barrett | 205/77 |
| 4,484,990 | 11/1984 | Buetman et al. | 204/106 |
| 4,544,460 | 10/1985 | Ochs | 204/107 |
| 4,561,887 | 12/1985 | Domic et al. | 75/416 |
| 4,874,534 | 10/1989 | Sorensen et al. | 210/803 |
| 4,891,105 | 1/1990 | Sein | 204/206 |
| 4,956,053 | 9/1990 | Polan et al. | 204/13 |
| 4,957,714 | 9/1990 | Olafson et al. | 423/24 |
| 5,031,432 | 7/1991 | Loesch et al. | 72/13 |
| 5,215,645 | 6/1993 | DiFranco et al. | 205/77 |
| 5,238,048 | 8/1993 | Hackman | 164/463 |
| 5,366,612 | 11/1994 | Clouser et al. | 205/73 |
| 5,458,746 | 10/1995 | Burgess et al. | 204/106 |

OTHER PUBLICATIONS

Walker et al., "The Morphology and Properties of Electrodeposited Copper Powder", Surface Technology, vol. 23 (1984), pp. 301–321.

Kordosky, "Copper Solvent Extraction: The State of the Art", JOM, May 1992, pp. 40–45.

International Search Report PCT/US95/09966 mailed Nov. 28, 1995.

Argall, "Copper Oxide to Copper Cathode", *World Mining*, Aug., 1976, pp. 48–51.

Bucci et al, "Copper Foil Technology", PC Fab, Jul. 1986, pp. 22–31.

Coppertron, "An Installation for and Method of Electrolytic Production of Copper Foils", British Patent 1,588,681 (Apr., 1981), Abstract 24051.

Eamon et al, "Plant Practices & Innovations", TMS Symposium, New Orleans, Louisiana, Feb. 1991, pp. 1–17.

Enchev et al, "Production of Copper Powder by the Method of Electrolytic Extraction Using a Reversing Current", *Sov. Powder Met. & Met. Ceramics*, V. 13, No. 9 (Sep. 1974), Translation by Plenum Publishing Corp. (1975), pp. 764–766.

Harper et al, "The Electrodeposition of Copper Powder With the Aid of Surfactants", Refinery and Mill Operations–Part I, CDA–ASM Conference Oct., 1972, Cleveland, Ohio.

Jayaweera et al, "Purification of Copper Amine Solution During the Production of Copper Oxide", Chemeca 86, 14th Aust. Chem. Engr. Conf. (1986), pp. 95–100.

Klar, "Production of Copper by the Reduction of Copper Oxide", Metals Handbook, Ninth Edition, vol. 7, p. 105–120 No Date.

Kordosky, "Copper Solvent Extraction: The State of the Art", JOM, May 1992, pp. 40–45.

Magma Copper Company, Pamphlet entitled"SX–EW/Solvent Extraction–Electrowinning". No Date.

Makowski et al, "Properties of Electrodeposited Foils for Use in Printed Circuite", *Symposium on Electrodeposited Metals as Materials for Selected Applications*, Battelle, Columbus, Ohio, (Jan., 1972), pp. 14–31, Abstract 17448.

Singh et al, "A Continuous & Self Regulating Method for Making Copper Powder by Electroysis", NML Technical Journal, vol. 17, Feb.–May 1975, pp. 23–26.

Taubenblat, "Electrodeposition of Metal Powders", *Metals Handbook Ninth Edition*, vol. 7. No Date.

Townson et al, "The Solvent Extraction of Copper–a Perspective", Reprinted for Mining Journal Limited, London. No Date.

Usol'tseva et al, "Electrodeposition of Fine Copper Powders in the Presence of Organic Additions", Plenum Publishing Corporation, (1983), p. 610–613, Translation from Poroshkovauh Metallurgiga, No. 8 (248) pp. 16–20, Aug. 1983.

Walker et al, "The Morphology and Properties of Electrodeposited Copper Powder", *Surface and Coatings Technology*, 23 (1984) pp. 301–321 No Month.

Walker et al, "The Stabilization of Electrodeposited Copper Powder", *Surface and Coatings Technology*, 27 (1986) pp. 137–144. No Month.

Williams, "Copper Powder Production at Nordduetsche Affinerie", MPR, Jan. 1989.

"The Economics of Pressing Grade Copper Powder Production", MPR, May 1984, pp. 251–255.

"Non–Ferrous Powder Production at Makin", MPR, Jan. 1987, pp. 15–20.

"Electrowon Cathode Takes Growing Share of Wiremill Market", Copper Studies, vol. 18, No. 10, Apr. 1991, pp. 7–12.

Search Report for PCT Application No. PCT/US94/02867, mailed Jun. 17, 1994.

PROCESS FOR MAKING COPPER WIRE

This application is a continuation-in-part of U.S. application Ser. No. 08/049,176, filed Apr. 19, 1993, now U.S. Pat. No. 5,366,612. This application is also a continuation-in-part of U.S. application Ser. No. 08/287,703, filed Aug. 9, 1994, now U.S. Pat. No. 5,458,746 which was a continuation of U.S. application Ser. No. 08/049,160, filed Apr. 19, 1993 now abandoned. These prior applications are incorporated herein by reference in their entireties.

TECHNICAL FIELD

This invention relates to a process for making copper wire. More particularly, this invention relates to a process for making copper wire directly from an impure copper source such as copper ore or copper-containing waste.

BACKGROUND OF THE INVENTION

The process for recovery of copper metal values from ores and processing liquids by solvent extraction-electrowinning (hereinafter, "SX-EW") is well-known. Briefly, the process is carried out using a copper-bearing aqueous solution which is obtained by dissolving (generally from an ore) the copper in an aqueous leach liquor, or by using a copper-bearing solution such as process effluent. The resulting solution of copper values is mixed with a water-immiscible organic solvent (e.g., kerosene) containing a water-insoluble ion exchange composition having selective affinity for the copper values. The ion exchange composition preferentially extracts the copper values from the aqueous solution. The aqueous and organic phases are separated. The aqueous solution, now copper-depleted, is usually referred to as "raffinate." The raffinate can be recycled as leach liquor (in a leaching process) or discarded (in a process such as recovery of copper from process effluent). The organic phase (which contains ion exchange composition and the extracted copper values) is usually referred to as "loaded organic." The desired copper values are removed from the loaded organic by mixing with an aqueous strip solution containing strong acid such as sulfuric, phosphoric, or perchloric acid, and having lower pH than the above copper-bearing aqueous solution. The aqueous strip solution extracts the desired copper values from the loaded organic. After separation of the organic and aqueous phases, the desired copper values are present in the aqueous strip solution. The resulting copper-rich aqueous strip solution is usually referred to as an "electrolyte" or "rich electrolyte." The copper-depleted organic phase is usually referred to as a "barren organic." The barren organic can be recycled.

Copper is recovered in purified form from the electrolyte by a technique known as "electrowinning" (hereafter sometimes referred to as "EW"). The electrowinning process typically involves plating the copper on copper starting sheets or stainless steel cathode mother blanks. The plating cycle usually takes about seven days to obtain a 100-pound cathode from each side of the mother blank. The cathodes are stripped mechanically from each side of the mother blank.

The manufacture of copper wire involves melting, casting and hot rolling these cathodes in a separate facility to produce copper rod which is normally 5/16-inch (7.94 mm) in diameter. This copper rod is then converted to copper wire, e.g., electrical wire. The first step in this process is the "rod breakdown" wherein the rod is cold drawn to about AWG #14. (1.628 mm). The intermediate wire after "rod breakdown" is further cold drawn to the final product size. During the cold drawing operation the wire can be periodically annealed.

The conventional method of copper wire production consumes much energy and requires extensive labor and capital costs. The melting, casting and hot rolling operations subject the product to oxidation and potential contamination from foreign materials such as refractory and roll materials which can subsequently cause problems to wire drawers generally in the form of wire breaks during drawing.

By virtue of the inventive process copper wire is produced in a simplified and less costly manner when compared to the prior art. The inventive process can utilize a copper source such as copper ore or copper-containing waste that is relatively impure. This process does not require use of the prior art steps of first making copper cathodes then melting, casting and hot rolling the cathodes to provide a copper rod feedstock. In one embodiment the production of a copper rod feedstock is not even necessary.

SUMMARY OF THE INVENTION

This invention relates to a process for making copper wire directly from a copper-bearing material, comprising: (A) contacting said copper-bearing material with an effective amount of at least one aqueous leaching solution to dissolve copper ions into said leaching solution and form a copper-rich aqueous leaching solution; (B) contacting said copper-rich aqueous leaching solution with an effective amount of at least one water-insoluble extractant to transfer copper ions from said copper-rich aqueous leaching solution to said extractant to form a copper-rich extractant and a copper-depleted aqueous leaching solution; (C) separating said copper-rich extractant from said copper-depleted aqueous leaching solution; (D) contacting said copper-rich extractant with an effective amount of at least one aqueous stripping solution to transfer copper ions from said extractant to said stripping solution to form a copper-rich stripping solution and a copper-depleted extractant; separating said copper-rich stripping solution from said copper-depleted extractant; (F) flowing said copper-rich stripping solution between an anode and a cathode, and applying an effective amount of voltage across said anode and said cathode to deposit copper on said cathode; (G) removing said copper from said cathode; and (H) converting said removed copper from (G) to copper wire at a temperature below its melting point. In one embodiment, the copper that is deposited on the cathode during (F) is in the form of copper foil, and the process includes (H-1) slitting the copper foil into a plurality of strands of copper wire and (H-2) shaping the strands of copper wire to provide said strands of copper wire with desired cross-sections. In one embodiment the copper that is deposited on the cathode during (F) is in the form of copper powder, and the process includes (H-1) extruding the copper powder to form copper rod or wire and (H-2) drawing the copper rod or wire to form copper wire with a desired cross-section. In one embodiment, during step (G) the copper, while on said cathode, is score cut to form a thin strand of copper which is then removed from the cathode, and during step (H) this thin strand of copper is shaped to form copper wire with a desired cross-section. Unexpectedly, impurities carried from the extraction steps used in the inventive process to the electrolyte solution used to electrodeposit copper in this process do not degrade performance characteristics of the copper wire that is produced. A significant advantage of the inventive process is that copper is converted to copper wire at temperatures below the melting point of the copper. That is, by virtue of the inventive process, copper wire is produced without the costly and energy consuming steps of melting, casting and hot rolling that are required by the prior art.

BRIEF DESCRIPTION OF THE DRAWINGS

In the annexed drawings like parts and features are designated by the like reference numerals.

DESCRIPTION OF THE PREFERRED EMBODIMENTS

Figure 1:
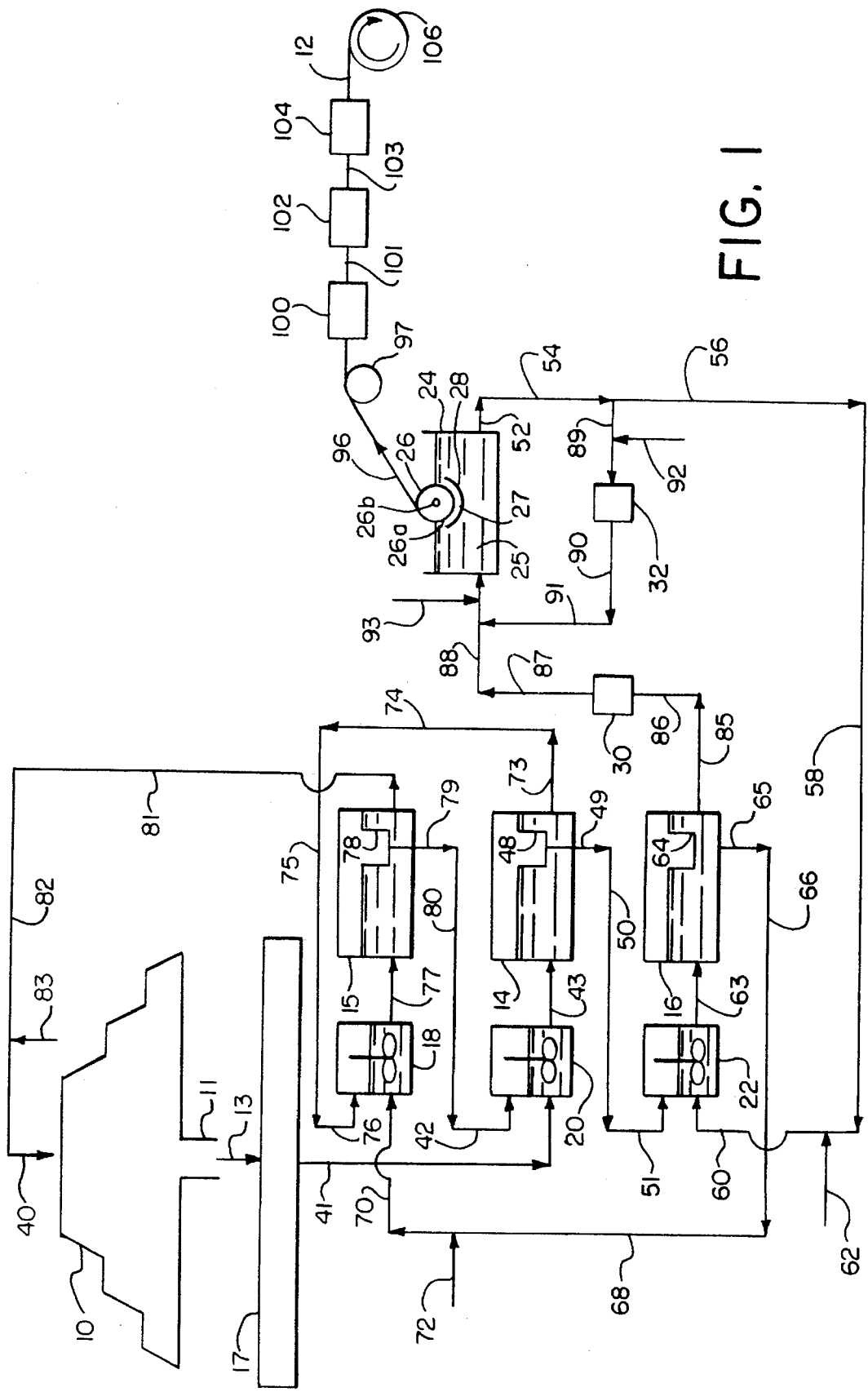
FIG. 1 is a flow sheet illustrating one embodiment of the invention wherein copper is extracted from copper ore, electrodeposited to form copper foil, and then the foil is slit and shaped to form copper wire.

The inventive process involves the combination of three separate technologies to produce copper wire directly from a relatively impure copper source such as copper ore or copper-containing waste. The first of these technologies involves solvent extraction, the second electrodeposition, and the third metal-working.

Solvent Extraction

The copper-bearing material can be any source of copper from which copper can be extracted. These sources include copper ore, smelter flue dust, copper cement, copper concentrates, copper smelter products, copper sulfate, and copper-containing waste. The term "copper-containing waste" refers to any solid or liquid waste material (e.g., garbage, sludge, effluent streams, etc.) that contains copper. These waste materials include hazardous wastes. Specific examples of wastes that can be used are copper oxides obtained from treating spent cupric chloride etchants. Also, copper sources used in the prior art such as copper shot, copper wire, recycled copper, etc., can be used, but the economic advantages of using the inventive process are reduced when such prior art sources are used.

In one embodiment copper ore from an open pit mine is used as the copper-bearing material. The ore is hauled to a heap-leaching dump which is typically built on an area underlain with a liner, such as a thick high-density polyethylene liner, to prevent loss of leaching fluids into the surrounding water shed. A typical heap-leaching dump has a surface area of, for example, about 125,000 square feet and contains approximately 110,000 tons of ore. As leaching progresses and new dumps are built on top of the old dumps, they become increasingly higher and eventually reach heights of, for example, about 250 feet or more. A network of pipes and wobbler sprinklers is laid on the surface of a newly completed dump and a weak solution of sulfuric acid is continuously sprayed at a rate of, for example, about 0.8 gallon per minute per 100 square feet of surface area. The leaching solution percolates down through the dump, dissolves copper in the ore, flows from the dump base as a copper-rich aqueous leach solution, drains into a collection pond, and is pumped to a feed pond for subsequent treatment using the inventive process.

With some mining operations in-situ leaching is used to extract copper values from copper ore. The copper-rich leach solution obtained by this process can be used in the inventive process as the copper-bearing material. In-situ leaching is useful when reserves of acid-soluble oxide ore lie beneath an open pit area and above the depleted portion of an underground mine or when a deposit is buried too deeply to be economically developed by open pit methods. Injection wells are drilled into this zone at a depth of, for example, about 1000 feet. The wells are cased with polyvinylchloride pipe, the bottom portion of which is slotted to allow solution into the ore. A leach solution of weak sulfuric acid is injected into each well at a rate dependent upon the permeability of the zone into which it is drilled. The solution percolates down through the ore zone, dissolves the copper minerals, and drains into a prepared collection area. The collection area can be, for example, haulage drifts of the underground mine. The copper-bearing aqueous leach solution that is produced is pumped to the surface by means of a corrosion-resistant pumping system where it is available for use as the copper-bearing material for the inventive process.

In mining operations wherein both leach dumps and in-situ leaching are employed, the copper-bearing leach solution (sometimes referred to as a pregnant leach solution) from each can be combined and used as the copper-bearing material in the inventive process.

The aqueous leaching solution used in (A) of the inventive process is preferably a sulfuric acid solution, halide acid solution (HCl, HF, HBr, etc.) or an ammonia solution. The sulfuric or halide acid solution generally has a sulfuric or halide acid concentration in the range of about 5 to about 50 grams per liter, and in one embodiment about 5 to about 40 grams per liter, and in one embodiment about 10 to about 30 grams per liter.

The ammonia solution generally has an ammonia concentration in the range of about 20 to about 140 grams per liter, and in one embodiment about 30 to about 90 grams per liter. The pH of this solution is generally in the range of about 7 to about 11, and in one embodiment about 8 to about 9.

The copper-rich aqueous leaching solution or pregnant leaching solution formed during (A) generally has a copper ion concentration in the range of about 0.8 to about 5 grams per liter, and in one embodiment about 1 to about 3 grams per liter. When the leaching solution used in (A) is a sulfuric acid solution, the concentration of free sulfuric acid in the copper-rich aqueous leaching solution is generally from about 5 to about 30 grams per liter, and in one embodiment about 10 to about 20 grams per liter. When the leaching solution used in (A) is an ammonia solution, the concentration of free ammonia in the copper-rich aqueous leaching solution is generally from about 10 to about 130 grams per liter, and in one embodiment about 30 to about 90 grams per liter.

The water-insoluble extractant used in (B) of the inventive process can be any water-insoluble extractant capable of extracting copper ions from an aqueous medium. In one embodiment the extractant is dissolved in a water-immiscible organic solvent. (The terms "water-immiscible" and "water-insoluble" refer to compositions that are not soluble in water above a level of about 1 gram per liter at 25° C.) The solvent can be any water-immiscible solvent for the extractant with kerosene, benzene, toluene, xylene, naphthalene, fuel oil, diesel fuel and the like being useful, and with kerosene being preferred. Examples of useful kerosenes are SX-7 and SX-12 which are available from Phillips Petroleum.

In one embodiment the extractant is an organic compound containing at least two functional groups attached to different carbon atoms of a hydrocarbon linkage, one of the functional groups being -OH and the other of said functional groups being =NOH. These compounds can be referred to as oximes.

In one embodiment the extractant is an oxime represented by the formula

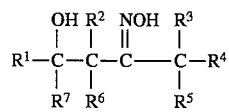

wherein $R^1$, $R^2$, $R^3$, $R^4$, $R^5$, $R^6$ and $R^7$ are independently hydrogen or hydrocarbyl groups. In one embodiment, $R^1$ and $R^4$ are each butyl; $R^2$, $R^3$ and $R^6$ are each hydrogen; and $R^5$ and $R^7$ are each ethyl. Compounds with this structure are available from Henkel Corporation under the trade designation LIX 63.

In one embodiment the extractant is an oxime represented by the formula

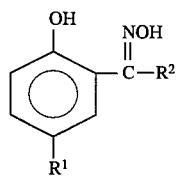

wherein $R^1$ and $R^2$ are independently hydrogen or hydrocarbyl groups. Useful embodiments include those wherein $R^1$ is an alkyl group of about 6 to about 20 carbon atoms, and in one embodiment about 9 to about 12 carbon atoms; and $R^2$ is hydrogen, an alkyl group of 1 to about 4 carbon atoms, and in one embodiment 1 or 2 carbon atoms, or $R^2$ is phenyl. The phenyl group can be substituted or unsubstituted with the latter being preferred. The following compounds, which are based upon the above-indicated formula, are available from Henkel Corporation under the trade designations indicated below and are useful with the inventive process:

| Trade Designation | $R^1$ | $R^2$ |
|---|---|---|
| LIX 65 | Nonyl | Phenyl |
| LIX 84 | Nonyl | Methyl |
| LIX 860 | Dodecyl | Hydrogen |

Other commercially available materials available from Henkel Corporation that are useful include: LIX 64N (identified as a mixture of LIX 65 and LIX 63); and LIX 864 and LIX 984 (identified as mixtures of LIX 860 and LIX 84).

In one embodiment the extractant is a betadiketone. These compounds can be represented by the formula

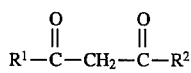

wherein $R^1$ and $R^2$ are independently alkyl groups or aryl groups. The alkyl groups generally contain 1 to about 10 carbon atoms. The aryl groups are generally phenyl. An example of a commercial extractant available from Henkel Corporation corresponding to the above formula is LIX 54.

These betadiketones are useful when the leaching solution used in (A) of the inventive process is an ammonia solution.

The concentration of the extractant in the organic solution is generally in the range of about 2% to about 40% by weight. In one embodiment the organic solution contains from about 5% to about 10%, or about 6% to about 8%, or about 7% by weight of LIX 984, with the remainder being SX-7.

In one embodiment the extractant is an ion-exchange resin. These resins are typically small granular or bead-like materials consisting of two principal parts: a resinous matrix serving as a structural portion, and an ion-active group serving as the functional portion. The functional group is generally selected from those functional groups that are reactive with copper ions. Examples of such functional groups include $-SO_3^-$, $-COO-$,

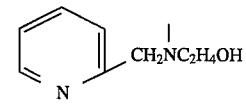

and

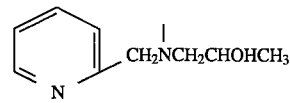

Useful resin matrixes include the copolymers of styrene and divinylbenzene. Examples of commercially available resins that can be used include IRC-718 (a product of Rohm & Haas identified as a tertiary amine substituted copolymer of styrene and divinylbenzene), IR-200 (a product of Rohm & Haas identified as sulfonated copolymer of styrene and divinylbenzene), IR-120 (a product of Rohm & Haas identified as sulfonated copolymer of styrene and divinylbenzene), XFS 4196 (a product of Dow identified as a macroporous polystyrene/divinylbenzene copolymer to which has been attached N-(2-hydroxyethyl)-picolylamine), and XFS 43084 (a product of Dow identified as a macroporous polystyrene/divinylbenzene copolymer to which has been attached N-(2-hydroxypropyl)-picolylamine). These resins are typically used in the inventive process as fixed beds or moving beds. During (B) of the inventive process, the resin is contacted with the copper-rich aqueous leach solution from (A), the contacting being sufficient to transfer copper ions from the leach solution to the resin. The copper-rich resin is then stripped during (D) to provide a copper-stripped or copper-depleted resin which can be used during (B).

The copper-rich extractant that is separated during (C) of the inventive process typically has a concentration of copper in the range of about 1 to about 6 grams per liter of extractant, and in one embodiment about 2 to about 4 grams per liter of extractant. The copper-depleted aqueous leaching solution that is separated during (C) typically has a copper ion concentration in the range of about 0.01 to about 0.8 grams per liter, and in one embodiment about 0.04 to about 0.2 grams per liter. When the leaching solution used in (A) is a sulfuric acid solution, the concentration of free sulfuric acid in the copper-depleted aqueous leaching solution separated during (C) is generally from about 5 to about 50 grams per liter, and in one embodiment about 5 to about 40 grams per liter, and in one embodiment about 10 to about 30 grams per liter. When the leaching solution used in (A) is an ammonia solution, the concentration of free ammonia in the copper-depleted aqueous leaching solution separated during (C) is generally from about 10 to about 130 grams per liter, and in one embodiment about 30 to about 90 grams per liter.

In one embodiment the contacting and separating steps (B) and (C) of the inventive process are conducted in two stages. In this embodiment, (B-1) and (B-2) are contacting steps and (C-1) and (C-2) are separating steps. Thus, in this embodiment, the inventive process involves the following sequence (A), (B-1), (C-1), (B-2), (C-2), (D), (E), (F) and (G), with process streams from several of these steps being recirculated to other steps in the process. (B-1) involves contacting the copper-rich aqueous leaching solution formed during (A) with an effective amount of at least one copper-bearing water-insoluble extractant from (C-2) to transfer copper ions from said copper-rich aqueous leaching solution to said copper-bearing extractant to form a copper-rich extractant and a first copper-depleted aqueous leaching solution. (C-1) involves separating the copper-rich extractant formed during (11-1) from the first copper-depleted aqueous leaching solution formed during (B-1). The copper-rich extractant that is separated during (C-1) generally has a concentration of copper in the range of about 1 to about 6 grams per liter of extractant, and in one embodiment about 2 to about 4 grams per liter of extractant. The first copper-depleted aqueous leaching solution that is separated during (C-1) generally has a copper ion concentration in the range of about 0.4 to about 4 grams per liter, and in one embodiment about 0.5 to about 2.4 grams per liter. When the leaching solution used in (A) is a sulfuric acid solution, the concentration of free sulfuric acid in the first copper-depleted aqueous leaching solution separated during (C-1) is generally from about 5 to about 50 grams per liter, and in one embodiment about 5 to about 30 grams per liter, and in one embodiment about 10 to about 30 grams per liter. When the leaching solution used in (A) is an ammonia solution, the concentration of free ammonia in the first copper-depleted aqueous leaching solution separated during (C-1) is generally from about 10 to about 130 grams per liter, and in one embodiment about 30 to about 90 grams per liter.

(B-2) involves contacting the first copper-depleted aqueous leaching solution separated during (C-1) with an effective amount of at least one copper-depleted extractant from (E) to transfer copper ions from said first copper-depleted aqueous leaching solution to said copper-depleted extractant to form a copper-bearing extractant and a second copper-depleted aqueous leaching solution. (C-2) involves separating the copper-bearing extractant formed during (B-2) from the second copper-depleted aqueous leaching solution formed during (B-2). The copper-bearing extractant that is separated during (C-2) generally has a concentration of copper in the range of about 0.4 to about 4 grams per liter of extractant, and in one embodiment about 1 to about 2.4 grams per liter of extractant. The second copper-depleted aqueous leaching solution that is separated during (C-2) generally has a copper ion concentration in the range of about 0.01 to about 0.8 grams per liter, and in one embodiment about 0.04 to about 0.2 grams per liter. When the leaching solution used in (A) is a sulfuric acid solution, the concentration of free sulfuric acid in the second copper-depleted aqueous leaching solution separated during (C-2) is generally from about 5 to about 50 grams per liter, and in one embodiment about 5 to about 40 grams per liter, and in one embodiment about 10 to about 30 grams per liter. When the leaching solution used in (A) is an ammonia solution, the concentration of free ammonia in the second copper-depleted aqueous leaching solution separated during (C-2) is generally from about 10 to about 130 grams per liter, and in one embodiment about 30 to about 90 grams per liter.

The stripping solution used in (D) of the inventive process is a sulfuric acid solution which has a free sulfuric acid concentration generally in the range of about 80 to about 300 grams per liter. In one embodiment, the copper that is removed during (G) is in the form of copper powder, and the free sulfuric acid concentration of the stripping solution used in (D) is about 150 to about 250 grams per liter. In one embodiment, the copper that is removed during (G) is in the form of copper foil or copper wire, and the free sulfuric acid concentration of the stripping solution used in (D) is in the range of about 80 to 170 grams per liter, and in one embodiment about 90 to about 120 grams per liter.

In one embodiment, the copper that is removed during (G) is in the form of copper powder, and the copper-rich stripping solution that is formed during (D) has a copper ion concentration generally in the range of about 1 to about 60 grams per liter, and in one embodiment about 5 to about 15 grams per liter; and a free sulfuric acid concentration in the range of about 70 to about 290 grams per liter, and in one embodiment about 140 to about 240 grams per liter.

In one embodiment, the copper that is removed during (G) is in the form of copper foil or copper wire, and the copper-rich stripping solution that is formed during (D) has a copper ion concentration that is generally in the range of about 50 to about 150 grams per liter, and in one embodiment about 80 to about 110 grams per liter; and a free sulfuric acid concentration in the range of about 70 to about 140 grams per liter, and in one embodiment about 80 to about 110 grams per liter.

Electrodeposition

The electrodeposition steps (F) and (G) of the inventive process involve advancing the copper-rich stripping solution from (E) into an electrolytic or electroforming cell and electrodepositing copper on the cathode of the cell. The copper-rich stripping solution treated in the electrolytic or electroforming cell can be referred to as either a copper-rich stripping solution or an electrolyte solution. In one embodiment, this electrolyte solution is subjected to a purification or filtering process prior to entering the cell. The electric current used in the cell can be direct current or alternating current with a direct current bias. The copper that is deposited on the cathode is in the form of copper foil or copper powder.

(1) Electrodeposition to Make Copper Foil

The electrodeposition steps (F) and (G) are conducted in an electroforming cell when making copper foil. The cathode is a rotating cathode. The rotating cathode preferably is in the form of a cylindrical mandrel. However, alternatively, when copper foil is being produced the cathode can be in the form of a moving belt. Both of these designs are known in the art. The anode has a curved shape conforming to the curved shape of the cathode to provide a uniform gap between the anode and the cathode. The anode is generally insoluble and made of lead, lead alloy, or titanium coated with a platinum family metal (i.e., Pt, Pd, Ir, Ru) or oxide thereof. This gap generally measures from about 0.3 to about 2 centimeters. In one embodiment, electrodeposited copper foil is formed on the cathode and then is peeled off as a thin web as the cathode rotates. In one embodiment, the cathode is cylindrical and copper is electrodeposited on the cathode to form a thin cylindrical sheath of copper around the cathode; this cylindrical sheath of copper is score cut to form a thin strand of copper, and this thin strand is peeled off the cathode as the cathode is rotated.

When the cathode is in the form of a cylindrical mandrel, it has a smooth surface for receiving the electrodeposited copper and the surface is preferably made of stainless steel, chrome plated stainless steel or titanium.

The velocity of the flow of the electrolyte solution through the gap between the anode and the cathode is generally in the range of about 0.2 to about 5 meters per second, and in one embodiment about 1 to about 3 meters per second. The electrolyte solution has a free sulfuric acid concentration generally in the range of about 70 to about 170 grams per liter, and in one embodiment about 80 to about 120 grams per liter. The temperature of the of the electrolyte solution in the electroforming cell is generally in the range of about 25° C. to about 100° C., and in one embodiment about 40° C. to about 70° C. The copper ion concentration is generally in the range of about 40 to about 150 grams per liter, and in one embodiment about 70 to about 130 grams per liter, and in one embodiment about 90 to about 110 grams per liter. The free chloride ion concentration is generally up to about 300 ppm, and in one embodiment up to about 150 ppm, and in one embodiment up to about 100 ppm. In one embodiment the free chloride ion concentration is from about 40 to about 100 ppm, or about 50 to about 80 ppm. The impurity level is generally at a level of no more than about 20 grams per liter, and typically is in the range of about 0.5 to about 10 grams per liter. The current density is generally in the range of about 100 to about 3000 amps per square foot, and in one embodiment about 400 to about 1800 amps per square foot.

During electrodeposition the electrolyte solution can optionally contain one or more active sulfur-containing materials. The term "active-sulfur containing material" refers to materials characterized generally as containing a bivalent sulfur atom both bonds of which are directly connected to a carbon atom together with one or more nitrogen atoms also directly connected to the carbon atom. In this group of compounds, the double bond may in some cases exist or alternate between the sulfur or nitrogen atom and the carbon atom. Thiourea is a useful active sulfur-containing material. The thioureas having the nucleus

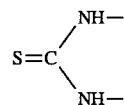

and the iso-thiocyanates having the grouping S=C=N— are useful. Thiosinamine (allyl thiourea) and thiosemicarbazide are also useful. The active sulfur-containing material should be soluble in the electrolyte solution and be compatible with the other constituents. The concentration of active sulfur-containing material in the electrolyte solution during electrodeposition is preferably up to about 20 ppm, more preferably in the range of about 0.1 to about 15 ppm.

The electrolyte solution can also optionally contain one or more gelatins. The gelatins that are useful herein are heterogeneous mixtures of water-soluble proteins derived from collagen. Animal glue is a preferred gelatin because it is relatively inexpensive, commercially available and convenient to handle. The concentration of gelatin in the electrolyte solution is generally up to about 20 ppm, and in one embodiment up to about 10 ppm, and in one embodiment in the range of about 0.2 to about 10 ppm.

The electrolyte solution can also optionally contain other additives known in the art for controlling the properties of the electrodeposited foil. Examples include molasses, guar gum, the polyalkylene glycols (e.g., polyethylene glycol, polypropylene glycol, polyisopropylene glycol, etc.), dithiothreitol, amino acids (e.g., proline, hydroxyproline, cysteine, etc.), acrylamide, sulfopropyl disulfide, tetraethylthiuram disulfide, benzyl chloride, epichlorohydrin, chlorohydroxylpropyl sulfonate, alkylene oxides (e.g., ethylene oxide, propylene oxide, etc.), the sulfonium alkane sulfonates, thiocarbamoyldisulfide, selenic acid, or a mixture of two or more thereof. These additives are preferably used in concentrations of up to about 20 ppm, more preferably about 1 to about 10 ppm.

During the electrodeposition step (F), it is preferred to maintain the ratio of applied current density (I) to diffusion limited current density ($I_L$) at a level of about 0.4 or less, and in one embodiment about 0.3 or less. That is, $I/I_L$ is preferably about 0.4 or less, and in one embodiment about 0.3 or less. The applied current density (I) is the number of amperes applied per unit area of electrode surface. The diffusion limited current density ($I_L$) is the maximum rate at which copper can be deposited. The maximum deposition rate is limited by how fast copper ions can diffuse to the surface of the cathode to replace those depleted by previous deposition. It can be calculated by the equation $$I_L = \frac{nFDC^*}{\delta(1-t)}$$

The terms used in the foregoing equation and their units are defined below:

| Symbol | Description | Units |
|---|---|---|
| I | Current Density | Amperes/cm$^2$ |
| $I_L$ | Diffusion Limited Current Density | Amperes/cm$^2$ |
| n | Equivalent Charge | Equivalents/mole |
| F | Faraday's Constant | 96487 (Amp/second)/equivalent |
| C° | Bulk Cupric Ion Concentration | Mole/cm$^3$ |
| D | Diffusion Coefficient | cm$^2$/second |
| δ | Concentration Boundary Layer Thickness | cm |
| t | Copper transfer number | dimensionless |

The boundary layer thickness δ is a function of viscosity, diffusion coefficient, and flow velocity. In one embodiment, the following parameter values are useful in electrodepositing copper foil:

| Parameter | Value |
|---|---|
| I (A/cm$^2$) | 1.0 |
| n (eq/mole) | 2 |
| D (cm$^2$/s) | 3.5 × 10$^{-5}$ |
| C° (mole/cm$^3$, Cu$^{+2}$ (as CuSO$_4$)) | 1.49 × 10$^{-3}$ |
| Temperature (°C.) | 60 |
| Free sulfuric acid (g/l) | 90 |
| Kinematic Viscosity (cm$^2$/s) | 0.0159 |
| Flow rate (cm/s) | 200 |

(2) Electrodeposition to Make Copper Powder

The electrodeposition steps (F) and (G) are conducted in an electrolytic cell equipped with at least one anode and at least one cathode. The cathode can be made of titanium or stainless steel. The anode is insoluble and can be made of titanium coated with a platinum family metal (e.g., Pt, Ir, Pd, Ru) or oxide thereof. The flow of the electrolyte solution through the electrolytic cell is sufficient to maintain constant a desired difference in copper ion concentration between electrolyte solution entering the cell and the electrolyte solution leaving the cell. Generally this difference in copper ion concentration is from about 1 to about 10 grams per liter, and in one embodiment about 1 to about 3 grams per liter, with the solution entering the electrolytic cell having a higher concentration of copper ions than the solution leaving the cell. Advantageously, the flow between the anode and the cathode is effected by natural convection. The electrolyte solution generally has a free sulfuric acid concentration in the range of about 70 to about 300 grams per liter, and in one embodiment about 140 to about 250 grams per liter. The temperature of the electrolyte solution in the electrolytic cell is generally in the range of about 20° C. to about 65° C., and in one embodiment 30° C. to about 45° C. The copper ion concentration is generally in the range of about 1 to about 60 grams per liter, and in one embodiment from about 4 to about 15 grams per liter. The free chloride ion concentration is generally up to about 100 ppm, and in one embodiment up to about 50 ppm. In one embodiment, the free chloride ion concentration is up to about 20 ppm, or up to about 15 ppm. The impurity level is generally at a level of no more than about 20 grams per liter, and in one embodiment is in the range of about 0.5 to about 10 grams per liter. The current density is generally in the range of about 20 to about 300 amps per square foot, and in one embodiment about 30 to about 200 amps per square foot.

During electrodeposition, one or more addition agents can be added to the electrolyte solution to alter the copper metal powder characteristics. These include gelatins derived from collagen, an example of which is animal glue. Other additives can be added to the electrolyte to control particle size of the powder. Examples of such other additives include benzotriazole and thiourea. Chloride ions can be added to increase the dendritic character of the powder particles and to increase the yield of free powder. Sodium sulfate can be added to reduce cathode current density. Increased amounts of sodium sulfate tend to reduce particle size of the powder. Sulfonates can be added to the electrolyte to provide for a more coarse particle size. Examples of such sulfonates include Orzan-A and Tembind, both of which are identified as ammonium lignosulfonates. These addition agents are typically added to the electrolyte solutions at concentration levels of up to about 20 grams per liter, and in one embodiment, up to about 10 grams per liter.

During the electrodeposition step (F), it is preferred to maintain the ratio of applied current density (I) to diffusion limited current density ($I_L$) at a level of about 0.8 or greater, and in one embodiment about 0.9 or greater. That is, $I/I_L$ is preferably about 0.8 or greater, and in one embodiment about 0.9 or greater.

In one embodiment the following parameter values are useful in electrodepositing copper powder:

| Parameter | Value |
| --- | --- |
| I (A/cm$^2$) | 0.060 |
| n (eq/mole) | 2 |
| D (cm$^2$/s) | $1.6 \times 10^{-5}$ |
| C° (mole/cm$^3$, Cu$^{+2}$ (as CuSO$_4$)) | $1.57 \times 10^{-4}$ |
| Temperature (°C.) | 38 |
| Free sulfuric acid (g/l) | 175 |
| Kinematic Viscosity (cm$^2$/s) | 0.0126 |
| Flow rate (cm/s) | Natural convection |

The copper metal powder can be removed from the cathode by brushing, scraping, vibration or other mechanical and/or electrical techniques known in the art. Powder can be removed by reversing the current on the cathode. Particle size can be controlled by controlling the length of the interval between powder removal with powder becoming coarser as the interval is increased. Also, the apparent density increases as the length of the interval is extended.

In one embodiment, a series of disc-shaped rotating cathodes are used which are partially submerged in the electrolyte solution. Cathodes of this type are disclosed, for example, in U.S. Pat. No. 3,616,277, which is incorporated herein by reference. Copper powder is deposited on the disc-shaped cathodes as they rotate through the electrolyte solution. The cathodes, which can be made, for example, of titanium and insoluble anodes (e.g., platinized titanium) are positioned in the electrolytic cell in interleaved arrangement with the cathodes. Powder is continuously deposited on the cathodes and continuously removed by doctor blades, which can be made of plastic or stainless steel and are mounted adjacent the cathodes above the electrolyte level of the cell.

In one embodiment the copper metal powder that is removed during (G) of the inventive process is washed sufficiently to remove electrolyte which can cause the powder to oxidize. Various methods can be employed to wash the powder. One method involves centrifuging the powder to remove the electrolyte, washing the powder and then dewatering the powder.

In one embodiment, the copper metal powder is transferred into a large tank and water is added to produce a slurry that is pumped into a filter. In the filter, the powder is dewatered, washed several times, and again dewatered. During this process stabilizers can be added to reduce oxidation. Examples of such stabilizers include aqueous solutions of gelatin. The addition of antioxidants during washing or subsequent powder treatment also protects the powder from oxidation. Examples of these antioxidants include benzotriazole.

After washing and dewatering, the wet powder can be subjected to heat treatments which tends to alter certain properties of the copper metal powder, particularly particle size and shape, apparent density, and green strength. In one embodiment, the powder is heat treated on a mesh belt electric furnace. To prevent the powder from falling through the belt, a continuous sheet of high wet-strength paper is fed to the belt, and then the powder is transferred to the paper. A roller compresses the powder to improve heat transfer. As it enters the furnace, water is driven off and the paper burns-but not before the powder has sintered sufficiently to prevent it from falling through the belt. The furnace atmosphere is produced in exothermic gas units in which natural gas and air are blended to yield an atmosphere containing, for example, about 17% hydrogen, about 12% CO, about 4% $CO_2$, with the balance being nitrogen. The gas is advanced through a cooler to the furnace. In the cooler, the gas is preferably cooled to about −22° C. to about −40° C., and water from the gas is condensed, thus lowering the dew point. The gas enters the furnace from the discharge end and, because it is cooled, aids in cooling the powder cake. The furnace operation dries the powder, alters the particle shape, reduces the oxides, and sinters the fines. The discharge temperature is sufficiently low to prevent reoxidation of the powder cake. By varying the furnace temperature between about 250° C. to about 900° C., and in one embodiment about 370° C. and about 650° C. and altering the time of exposure, change can be made in the content of fines, apparent density, and dimensional characteristics. Upon completion of the heat treating operation, the resulting powder cake is broken and is ready for milling.

Milling can be performed, for example, in a high-speed, water-cooled hammer mill in which feed rate, mill speed, and screen openings under the mill can be varied to obtain the powder characteristics desired. The powder leaving the mill can be fed to screens where it is separated into particle size fractions. The −100 mesh powder can be classified in an air classifier and the fines can be blended in with the final powder product. Oversize material can be returned to the mill for additional milling. Alternatively, either or both undersized and oversized particles can be combined with the first electrolyte solution separated during (E). The copper metal powders produced during the milling and classifying operations can be stored in drums to which a drying agent such as silica gel or camphor can be added to prevent or reduce oxidation.

The properties of copper metal powder produced by the inventive process are dependent on various characteristics of the operation and, therefore, can often be controlled by altering certain process variables. Purity of powder prepared by the inventive process can be high, with copper contents that can exceed, for example, about 99.5% by weight. A measure of the oxygen content can be obtained by exposing a sample of powder to hydrogen at an elevated temperature as specified in American Society for Testing and Materials standard ASTM E 159 or Metal Powder Industries Federation standard MP1F 02. Generally, the hydrogen loss can range, for example, from about 0.1 to about 0.5%, depending on the apparent density and particle size distribution of the powder. Nitric acid insolubles are also determined by ASTM or MP1F standard procedures and can be less than, for example, about 0.05% by weight.

Particle size distribution for the copper powder can be selected to meet the requirements of the application and can be varied over a wide range. For example, the −325 mesh fraction can be varied from about 5% to about 90% by weight.

Apparent densities of the powder can be in the range of, for example, about 1 to about 4 g/cm$^3$. Densities that are somewhat lower and higher can be produced, depending on process conditions. Generally powders with apparent densities of less than about 1.3 g/cm$^3$ do not flow, powders with apparent densities of about 1.3 to about 2.3 g/cm$^3$ have poor flow rates, and powders with high apparent densities flow freely. At about 2.2 g/cm$^3$, which is the transition range flow depends on the content of fine particles of the powder, because relatively fine powders have poor flowability and relatively coarse powders flow freely. Typical flow rates range from about 10 to about 50 seconds for a 50-gram sample.

Green density is a function of the compacting pressure. For example, the green density can rise from 7 to about 8 g/cm$^3$ as the compacting pressure is increased from about 20 to about 40 tons per square inch (tsi). Green strength increases with the compacting pressure. For example, the green strength can rise from less than about 2200 psi up to about 3500 psi as the compacting pressure is increased from about 20 to about 40 tsi. Particle shape of the copper metal powder is generally dendritic when deposited on the cathode. During subsequent operations, however, the dendrites tend to become rounded.

Metal-Working

The metal-working required by the inventive process is dependent upon whether copper foil or copper powder is formed during electrodeposition. In one embodiment copper foil is formed and the metal-working process includes slitting the copper foil into a plurality of strands of copper wire and shaping the strands of copper wire to provide said strands of copper wire with round or shaped cross-sections. In one embodiment copper powder is formed, and the process includes extruding the copper powder to form copper rod or wire and drawing the copper rod or wire to form copper wire with a desired cross-section.

(1) Slitting Copper Foil and Shaping the Resulting Strands to Make Copper Wire

The foil can be slit using one or several slitting steps to form a plurality of strands or ribbons of copper having cross-sections that are approximately rectangular in shape. In one embodiment, two sequential slitting steps are used. In one embodiment, the foil has a thickness in the range of about 0.001 to about 0.050 inch, or about 0.004 to about 0.010 inch. The foil is slit into strands having widths of about 0.25 to about 1 inch, or about 0.3 to about 0.7 inch, or about 0.5 inch. These strands are then sheared to widths that are about 1 to about 3 times the thickness of the foil, and in one embodiment the width to thickness ratio is about 1.5:1 to about 2:1. In one embodiment a 4-ounce foil is slit into a strand having a cross-section of about 0.005×0.250 inch, then sheared to a cross-section of about 0.005×0.010 inch.

The slit and sheared strands of copper foil are then rolled to provide strands of copper with preferably square or substantially square cross-sections. In one embodiment, the strands are rolled using turks heads wherein the strands are pulled through two pairs of opposed rigidly-mounted forming rolls in the turks head. A powered turks head wherein the rolls are driven can be used. The turks head speed can be about 600 feet per minute. In one embodiment the strands are subjected to three passes through a turks head. In the first, the strands are rolled from a cross-section of 0.005×0.010 inch to a cross-section of 0.0088×0.0052 inch. In the second, the strands are rolled from a cross-section of 0.0088×0.0052 inch to a cross-section of 0.0070×0.0054 inch. In the third, the strands are rolled from a cross-section of 0.0070×0.0054 inch to a cross-section of 0.0056×0.0056 inch.

In one embodiment, the copper is electrodeposited on a rotating cathode, which is in the form of a cylindrical mandrel, until the thickness of the copper on the cathode is from about 0.005 to about 0.050 inch, or about 0.010 to about 0.030 inch, or about 0.020 inch. Electrodeposition is then discontinued and the surface of the copper is washed and dried. A score cutter is used to cut the copper into a thin strand of copper which is then peeled off the cathode. The score cutter travels along the length of the cathode as the cathode rotates. The score cutter preferably cuts the copper to within about 0.001 inch of the cathode surface. The width of the strand of copper that is cut is, in one embodiment, from about 0.005 to about 0.050 inch, or from about 0.010 to about 0.030 inch, or about 0.020 inch. In one embodiment, the copper strand has a square or substantially square cross-section that is from about 0.005×0.005 inch to about 0.050×0.050 inch, or about 0.010 ×0.010 inch to about 0.030×0.030 inch, or about 0.020×0.020 inch.

In one embodiment, the square cross-sectioned strands or wires that are produced in the turks head or are score cut and peeled off the cathode are drawn through a die to provide the strands or wires with desired cross-sections which, in one embodiment, are round cross-sections. The die can be a square-to-round pass die wherein the incoming copper strip or wire contacts the die in the drawing cone along a planar locus, and exits the die along a planar locus. The included die angle, in one embodiment, is about 8° or less. In one embodiment, a strand or wire having a square cross-section of 0.0056×0.0056 inch is drawn through a die in a single pass to provide a wire with a round cross-section and a cross-sectional diameter of 0.0056 inch (AWG 35). The wire can then be further drawn through additional dies to reduce the diameter.

(2) Extruding Copper Powder to Form Copper Rod or Wire and Then Drawing the Copper Rod or Wire to Form Copper Wire of Desired Cross-Section The copper metal powder is friction extruded using a machined rotating drum and a shaped feed slot to produce a copper rod or wire. In this embodiment, friction is generated in the drum to compact the powder and thereby form the copper rod or wire. The copper rod or wire has a cross-sectional diameter of about 0.5 to about 12 mm, and in one embodiment about 0.5 to about 2 min.

The copper rod or wire is then drawn through a die to form copper wire with a desired cross-section which, in one embodiment, is a round cross-section. In one embodiment, the die is tungsten carbide, diamond or polycrystalline diamond. Copper wires with round cross-sections and cross-sectional diameters of about 0.1 to about 2 mm, and in one embodiment about 0.2 to about 0.5 mm, are produced. The wire can be drawn through additional dies to reduce the diameter further.

Wire Coating

In one embodiment, the copper wire is coated with one or more of the following coatings:

| | |
|---|---|
| (1) Lead, or lead alloy (80Pb—20Sn) | ASTM B189 |
| (2) Nickel | ASTM B355 |
| (3) Silver | ASTM B298 |
| (4) Tin | ASTM B33 |

These coatings are applied to (a) retain solderability for hookup-wire applications, (b) provide a barrier between the copper and insulation materials such as rubber, that would react with the copper and adhere to it (thus making it difficult to strip insulation from the wire to make an electrical connection) or (c) prevent oxidation of the copper during high-temperature service.

Tin-lead alloy coatings and pure tin coatings are the most common; nickel and silver are used for specialty and high-temperature applications.

The copper wire can be coated by hot dipping in a molten metal bath, electroplating or cladding. In one embodiment, a continuous process is used; this permits "on line" coating following the wire-drawing operation.

Stranded wire can be produced by twisting or braiding several wires together to provide a flexible cable. Different degrees of flexibility for a given current-carrying capacity can be achieved by varying the number, size and arrangement of individual wires. Solid wire, concentric strand, rope strand and bunched strand provide increasing degrees of flexibility; within the last three categories, a larger number of finer wires can provide greater flexibility.

Stranded copper wire and cable can be made on machines known as "bunchers" or "stranders." Conventional bunchers are used for stranding small-diameter wires (34 AWG up to 10 AWG). Individual wires are payed off reels located alongside the equipment and are fed over flyer arms that rotate about the take-up reel to twist the wires. The rotational speed of the arm relative to the take-up speed controls the length of lay in the bunch. For small, portable, flexible cables, individual wires are usually 30 to 44 AWG, and there may be as many as 30,000 wires in each cable.

A tubular buncher, which has up to 18 wire-payoff reels mounted inside the unit, can be used. Wire is taken off each reel while it remains in a horizontal plane, is threaded along a tubular barrel and is twisted together with other wires by a rotating action of the barrel. At the take-up end, the strand passes through a closing die to form the final bunch configuration. The finished strand is wound onto a reel that also remains within the machine.

Supply reels in conventional stranders for large-diameter wire are fixed onto a rotating frame within the equipment and revolve about the axis of the finished conductor. There are two basic types of machines that can be used. In one, known as a rigid-frame strander, individual supply reels are mounted in such a way that each wire receives a full twist for every revolution of the strander. In the other, known as a planetary strander, the wire receives no twist as the frame rotates.

These types of stranders are comprised of multiple bays, with the first bay carrying six reels and subsequent bays carrying increasing multiples of six. The core wire in the center of the strand is payed off externally. It passes through the machine center and individual wires are laid over it. In this manner, strands with up to 127 wires are produced in one or two passes through the machine depending on its capacity for stranding individual wires.

In one embodiment, hard-drawn copper wire is stranded on a planetary machine so that the strand will not be as springy and will tend to stay bunched rather than spring open when it is cut off. The finished product is wound onto a power-driven external reel that maintains a prescribed amount of tension on the stranded wire.

Insulation and Jacketing

In one embodiment, the copper wire is coated or covered with an insulation or jacketing. Three types of insulation or jacketing materials can be used. These are polymeric, enamel and paper-and-oil.

In one embodiment, the polymers that are used are polyvinyl chloride (PVC), polyethylene, ethylene propylene rubber (EPR), silicone rubber, polytetrafluoroethylene (PTFE) and fluorinated ethylene propylene (FEP). Polyamide coatings are used where fire-resistance is of prime importance, such as in wiring harnesses for manned space vehicles. Natural rubber can be used. Synthetic rubbers can be used wherever good flexibility must be maintained, such as in welding or mining cable.

Many varieties of PVC are useful. These include several that are flame-resistant. PVC has good dielectric strength and flexibility, and is particularly useful because it is one of the least expensive conventional insulating and jacketing materials. It is used mainly for communication wire, control cable, building wire and low-voltage power cables. PVC insulation is normally selected for applications requiring continuous operation at low temperatures up to about 75° C.

Polyethylene, because of its low and stable dielectric constant, is useful when better electrical properties are required. It resists abrasion and solvents. It is used chiefly for hookup wire, communication wire and high-voltage cable. Cross-linked polyethylene (XLPE), which is made by adding organic peroxides to polyethylene and then vulcanizing the mixture, yields better heat-resistance, better mechanical properties, better aging characteristics, and freedom from environmental stress cracking. Special compounding can provide flame-resistance in cross-linked polyethylene. Typical uses include building wire, control cables and power cables. The usual maximum sustained operating temperature is about 90° C.

PTFE and FEP are used to insulate jet aircraft wire, electronic equipment wire and specialty control cables, where heat resistance, solvent resistance and high reliability are important. These electrical cables can operate at temperatures up to about 250° C.

These polymeric compounds can be applied over the copper wire using extrusion. The extruders are machines that convert pellets or powders of thermoplastic polymers into continuous covers. The insulating compound is loaded into a hopper that feeds it into a long, heated chamber. A continuously revolving screw moves the pellets into the hot zone, where the polymer softens and becomes fluid. At the end of the chamber, molten compound is forced out through a small die over the moving copper wire, which also passes through the die opening. As the insulated copper wire leaves the extruder it is water-cooled and taken up on reels. Wire jacketed with EPR and XLPE preferably go through a vulcanizing chamber prior to cooling to complete the cross-linking process.

Film-mated wire, usually fine magnet wire, generally comprises a copper wire coated with a thin, flexible enamel film. These insulated copper wires are used for electromagnetic coils in electrical devices, and must be capable of withstanding high breakdown voltages. Temperature ratings range from about 105° C. to about 220° C., depending on enamel composition. Useful enamels are based on polyvinyl acetals, polyesters and epoxy resins.

Equipment for enamel coating of wire often is custom built, but standard lines are available. Basically, systems are designed to insulate large numbers of wires simultaneously. In one embodiment, wires are passed through an enamel applicator that deposits a controlled thickness of liquid enamel onto the wire. Then the wire travels through a series of ovens to cure the coating, and finished wire is collected on spools. In order to build up a heavy coating of enamel, it may be necessary to pass wires through the system several times. Powder-coating methods are also useful. These avoid evolution of solvents, which is characteristic of curing conventional enamels, and thus make it easier for the manufacturer to met OSHA and EPA standards. Electrostatic sprayers, fluidized beds and the like can be used to apply such powdered coatings.

Cellulose can be used for electrical insulation. Oil-impregnated cellulose paper is used to insulate high-voltage cables for critical power-distribution applications. The paper, which may be applied in tape form, is wound helically around the conductors using special machines in which 6 to 12 paper-filled pads are held in a cage that rotates around the cable. Paper layers are wrapped alternately in opposite directions, free of twist. Paper-wrapped cables then are placed inside special impregnating tanks to fill the pores in the paper with oil and to ensure that all air has been expelled from the wrapped cable.

DESCRIPTION OF THE ILLUSTRATED EMBODIMENTS

Referring now to FIG. 1 which is a flow sheet illustrating one embodiment of the inventive process, copper is extracted from copper leach dump 10 and treated in accordance with the inventive process to produce a copper wire 12. The process involves the use of settlers 14, 15 and 16, collection pond 17, mixers 18, 20 and 22, electroforming cell 24 which includes rotating cylindrical cathode 26 and anode 28, filters 30 and 32, slitter 100, turks head 102, die 104 and toiler 106. In this embodiment, step (A) of the inventive process is conducted at the leach dump 10. Steps (B) and (C) are conducted in two stages using mixers 18 and 20 and settlers 14 and 15. Steps (D) and (E) are conducted using mixer 22 and settler 16. Steps (F) and (G) are conducted using electroforming cell 24. Step (H) is conducted using slitter 100, turks head 102, die 104 and coiler 106.

Aqueous leach solution from line 40 is sprayed onto the surface of the leach dump 10. The leach solution is a sulfuric acid solution having a free sulfuric acid concentration generally in the range of about 5 to about 50, and in one embodiment about 5 to about 40, and in one embodiment about 10 to about 30 grams per liter. The leach solution percolates down through the dump, dissolves copper in the ore, flows through the dump space 11 as a copper-rich aqueous leach solution (sometimes referred to as a pregnant leach solution), flows through line 13 into collection pond 17 and from there is pumped through line 41 into mixer 20. The copper-rich aqueous leach solution that is pumped to mixer 20 has a copper ion concentration generally in the range of about 0.8 to about 5, and in one embodiment about 1 to about 3 grams per liter; and a free sulfuric acid concentration generally in the range of about 5 to about 30, and in one embodiment about 10 to about 20 grams per liter. In mixer 20, the copper-rich aqueous leach solution is mixed with a copper-bearing organic solution which is pumped into mixer 20 through lines 79, 80 and 42 from weir 78 in settler 15. The concentration of copper in the copper-bearing organic solution that is added to mixer 20 is generally from about 0.4 to about 4 grams per liter of extractant in the organic solution, and in one embodiment about 1 to about 2.4 grams per liter of extractant in the organic solution. During the mixing in mixer 20, an organic phase and an aqueous phase form and intermix. Copper ions transfer from the aqueous phase to the organic phase. The mixture is pumped from mixer 20 through line 43 to settler 14. In settler 14, the aqueous phase and organic phase separate with the organic phase forming the top layer and the aqueous phase forming the bottom layer. The organic phase collects in weir 48 and is pumped through lines 49, 50 and 51 to mixer 22. This organic phase is a copper-rich organic solution (which can be referred to as a loaded organic). This copper-rich organic solution generally has a copper concentration in the range of about 1 to about 6 grams per liter of extractant in the organic solution, and in one embodiment about 2 to about 4 grams per liter of extractant in the organic solution.

The copper-rich organic solution is mixed in mixer 22 with a copper-depleted stripping solution. The copper-depleted stripping solution (which can be referred to as a lean electrolyte) is produced in the electroforming cell 24 and is pumped through lines 52, 54, 56, 58 and 60 to mixer 22. This copper-depleted stripping solution generally has a free sulfuric acid concentration in the range of about 80 to about 170, and in one embodiment about 90 to about 120 grams per liter; and a copper ion concentration in the range of generally about 40 to about 120, and in one embodiment about 80 to about 100, and in one embodiment about 90 to about 95 grams per liter. Fresh stripping solution make-up can be added to line 60 through line 62. The copper-rich organic solution and copper-depleted stripping solution are mixed in mixer 22 with the result being the formation of an organic phase intermixed with an aqueous phase. Copper ions transfer from the organic phase to the aqueous phase. The mixture is pumped from mixer 22 through line 63 to settler 16. In settler 16, the organic phase separates from the aqueous phase with the organic phase collecting in weir 64. This organic phase is a copper-depleted organic solution (which is sometimes referred to as a barren organic). This copper-depleted organic solution generally has a copper concentration in the range of about 0.5 to about 2 grams per liter of extractant in the organic solution, and in one embodiment about 0.9 to about 1.5 grams per liter of extractant in the organic solution. The copper depleted organic solution is pumped from settler 16 through lines 65, 66, 68 and 70 to mixer 18. Fresh organic solution make-up can be added to line 68 through line 72.

Copper-containing aqueous leach solution is pumped from settler 14 through lines 73, 74, 75 and 76 to mixer 18. This copper-containing aqueous leach solution has a copper ion concentration generally in the range of about 0.4 to about 4, and in one embodiment about 0.5 to about 2.4 grams per liter; and a free sulfuric acid concentration generally in the range of about 5 to about 50, and in one embodiment about 5 to about 30, and in one embodiment about 10 to about 20 grams per liter. In mixer 18, an organic phase and aqueous phase form, intermix and copper ions transfer from the aqueous phase to the organic phase. The mixture is pumped through line 77 to settler 15. In settler 15, the organic phase separates from the aqueous phase with the organic phase collecting in weir 78. This organic phase, which is a copper-containing organic solution, is pumped from settler 15 through lines 79, 80 and 42 to mixer 20. This copper-containing organic solution has a copper concentration generally in the range of about 0.5 to about 4 grams per liter of extractant in the organic solution, and in one embodiment about 1 to about 2.4 grams per liter of extractant in the organic solution. The aqueous phase in settler 15 is a copper-depleted aqueous leaching solution which is pumped through lines 81 and 82 to line 40 wherein it is sprayed over the leach dump 10. Fresh leaching solution make-up can be added to line 81 through 83.

The aqueous phase which separates out in settler 16 is a copper-rich stripping solution. It is pumped from settler 16 through lines 85 and 86 to filter 30 and from filter 30 through lines 87 and 88 to electroforming cell 24. This copper-rich stripping solution has a copper ion concentration generally in the range of about 50 to about 150 grams per liter, and in one embodiment about 90 to about 110 grams per liter; and a free sulfuric acid concentration generally in the range of about 70 to about 140, and in one embodiment about 80 to about 110 grams per liter. The copper-rich stripping solution entering electroforming cell 24 can also be referred to as electrolyte solution 25. The electrolyte solution 25 flows in the gap 27 between rotating cathode 26 and anode 28. When voltage is applied between the anode 28 and cathode 26, electrodeposition of copper occurs at the cathode surface 26a. The electrodeposited copper is removed from the cathode as a continuous thin web 96 of copper foil.

The electrolyte solution 25 is converted to a copper-depleted electrolyte solution in electroforming cell 24 and is withdrawn from cell 24 through line 52. The copper-depleted electrolyte solution in line 52 has a copper ion concentration generally in the range of about 40 to about 120 grams per liter, and in one embodiment about 80 to about 100 grams per liter, and in one embodiment about 90 to about 95 grams per liter; and a free sulfuric acid concentration generally in the range of about 80 to about 170 grams per liter, and in one embodiment about 90 to about 120 grams per liter. This copper-depleted electrolyte is either: (1) recirculated through lines 52, 54 and 89 to filter 32 and through filter 32 to lines 90, 91 and 88 and back to cell 24; or (2) pumped through lines 52, 54, 56, 58 and 60 to mixer 22 as the copper-depleted stripping solution. Optionally, active-sulfur containing material, gelatin and/or other desirable additives of the type discussed above are added to the recirculating solution in line 89 through line 92 or in line 88 through line 93.

In the electroforming cell 24, electrical means that are well known in the art are provided for applying an electrical current between anode 28 and cathode 26. The current is generally direct current or alternating current with a direct current bias. Copper ions in electrolyte solution 25 gain electrons at the peripheral surface 26a of cathode 26 whereby metallic copper plates out in the form of a copper foil layer. Cathode 26 rotates continuously about its axis 26b and the foil layer is continuously withdrawn from cathode surface 26a as a continuous web 96.

The electrodeposition process in the electroforming cell 24 depletes the electrolyte solution 25 of copper ions, and, if used, gelatin and active-sulfur containing material. These ingredients are replenished, the electrolyte being replenished through line 88, the gelatin and active-sulfur containing material being replenished through lines 92 or 93.

Copper foil 96 is peeled off cathode 26, and passes over roller 97 into and through slitter 100 wherein it is slit into a plurality of continuous strands 101 of copper wire having cross-sections that are rectangular or substantially rectangular in shape. These rectangular strands are advanced through turks head 102 wherein they are rolled to provide strands 103 having square cross-sections. Strands 103 are then drawn through die 104 wherein they are drawn to form copper wire 12 with round cross-sections. Copper wire 12 is coiled on coiler 106.

Figure 3:
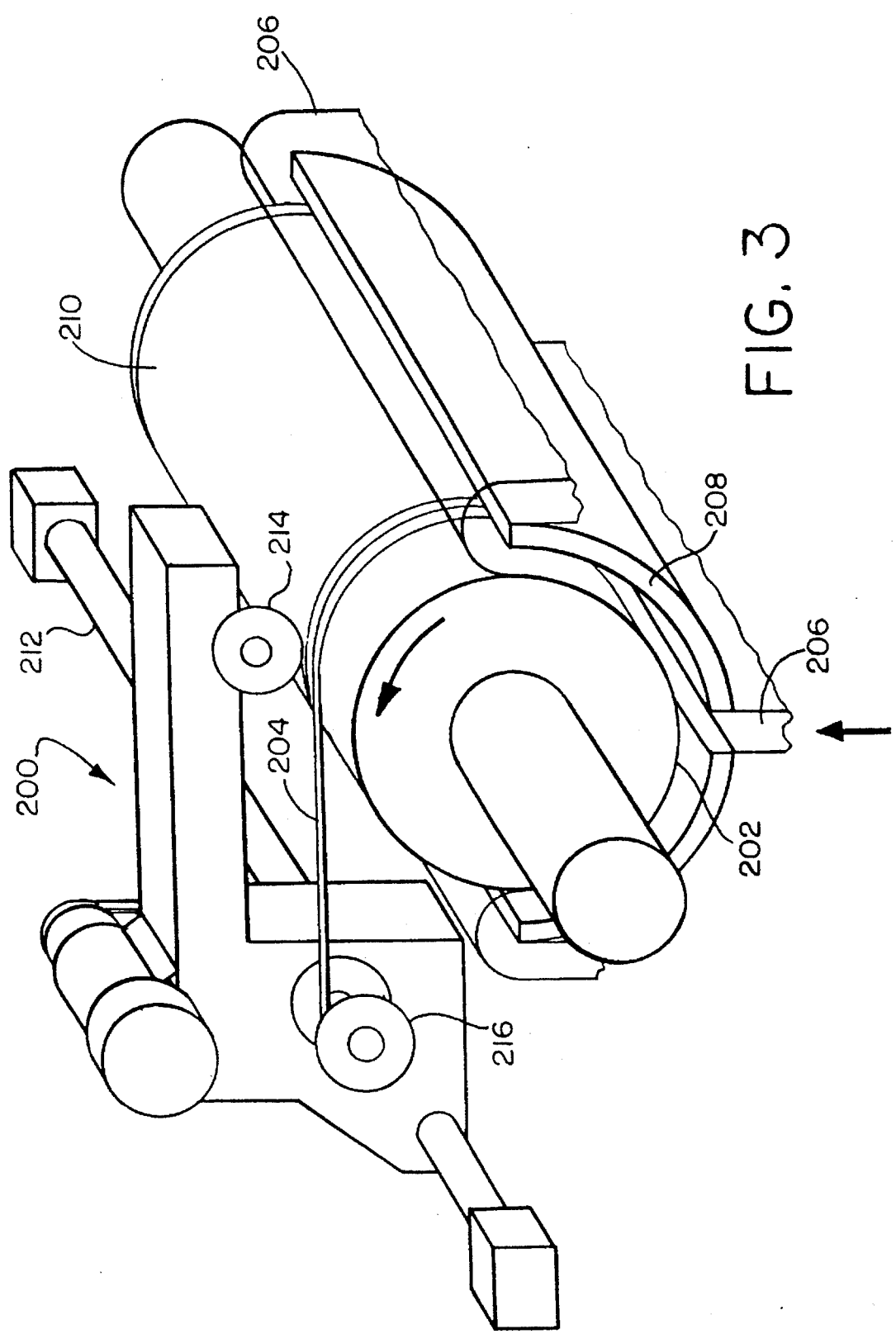
FIG. 3 is a schematic illustration illustrating one embodiment of the invention wherein copper which has been electrodeposited on a cylindrical cathode is score cut to form a thin strand of copper.

Referring now to FIG. 3, a score cutter 200 is used in combination with cathode 202, which is in the form of a cylindrical mandrel, to produce a continuous thin strand 204 of copper. Electrolyte solution 206 flows between anode 208 and cathode 202, voltage is applied across anode 208 and cathode 202, and copper 210 deposits on the surface of cathode 202. Electrodeposition of copper on cathode 202 is continued until the thickness of the copper is at a desired level, e.g., about 0.005 to about 0.050 inch. Electrodeposition is then discontinued. Copper 210 is washed and dried. Score cutter 200 is then activated to cut copper 210 into thin continuous strand 204. Score cutter 200 travels along screw 212 as cathode 202 rotates. Rotary blade 214 cuts copper 210 to within about 0.001 inch of the surface of cathode 202. Strand 204, which in one embodiment, has a square or substantially square cross-section, is then peeled off and collected on spool 216. Strand 204 can then be drawn through one or more dies to provide copper wire with a desired cross-section, which in one embodiment, is a round cross-section.

Figure 2:
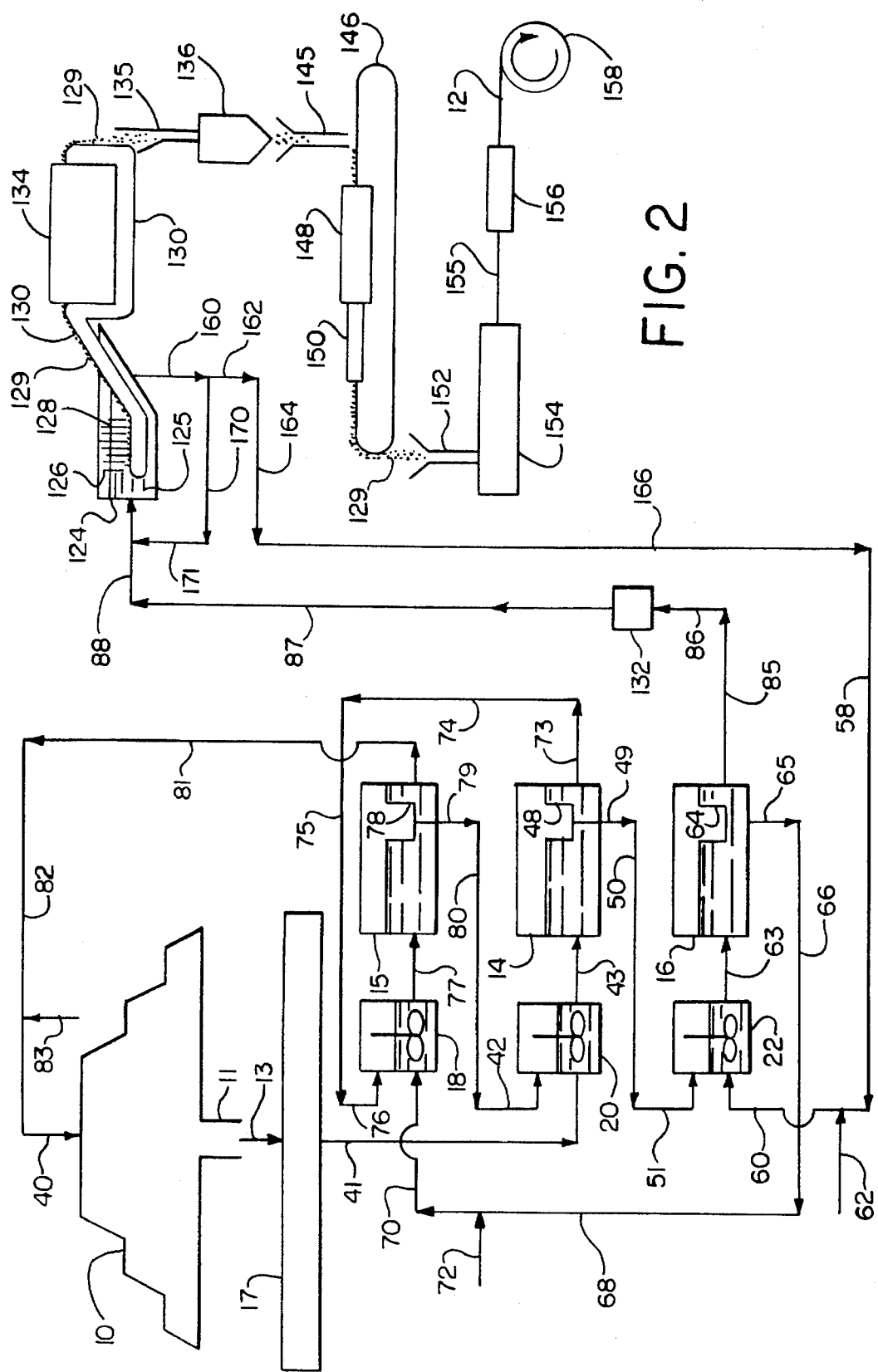
FIG. 2 is a flow sheet illustrating one embodiment of the invention wherein copper is extracted from copper ore, electrodeposited to form copper powder, and the copper powder is extruded and then drawn to form copper wire.

Referring now to FIG. 2, copper is extracted from leach dump 10 and treated in accordance with the inventive process to produce copper wire 12. In this embodiment, the process involves the use of settlers 14, 15 and 16, collection pond 17, mixers 18, 20 and 22, electrolytic cell 124 which includes interleaved cathodes 126 and insoluble anodes 128, endless belts 130 and 146, filter 132, rinse and dewater unit 134, storage hopper 136, powder spreading weir 145, furnace 148, cooling chamber 150, sinter cake breaker 152, extruder 154, die 156, and toiler 158. In this embodiment, step (A) of the inventive process is conducted at the leach dump 10. Steps (B) and (C) are conducted in two stages using mixers 18 and 20 and settlers 14 and 15. Steps (D) and (E) are conducted using mixer 22 and settler 16. Steps (F) and (G) are conducted using electrolytic cell 124 and belt 130. Step (H) is conducted using extruder 154 and die 156.

Aqueous leach solution from line 40 is sprayed onto the surface of the leach dump 10. The leach solution is a sulfuric acid solution having a sulfuric acid concentration generally in the range of about 5 to about 50, and in one embodiment about 5 to about 40 grams per liter, and in one embodiment about 10 to about 30 grams per liter. The leach solution percolates down through the dump, dissolves copper in the ore, flows through the dump space 11 as a copper-rich aqueous leach solution (sometimes referred to as a pregnant leach solution), flows through line 13 into collection pond 17 and from there is pumped through line 41 into mixer 20. The copper-rich aqueous leach solution that is pumped into mixer 20 generally has a copper ion concentration in the range of about 0.8 to about 5 grams per liter, and in one embodiment about 1 to about 3 grams per liter; and a free sulfuric acid concentration generally in the range of about 5 to about 30 grams per liter, and in one embodiment about 10 to about 20 grams per liter. In mixer 20, the copper-rich aqueous leach solution is mixed with a copper-bearing organic solution which is pumped into mixer 20 from weir 78 of settler 15 through lines 79, 80 and 42. The concentration of copper in the copper-bearing organic solution that is added to mixer 20 is generally from about 0.5 to about 4 grams per liter of extractant in the organic solution, and in one embodiment about 1 to about 2.4 grams per liter of extractant in the organic solution. During the mixing in mixer 20 an organic phase and an aqueous phase form and intermix. Copper ions transfer from the aqueous phase to the organic phase. The mixture is pumped from mixer 20 through line 43 to settler 14. In settler 14, the aqueous phase and organic phase separate with the organic phase forming the top layer and the aqueous phase forming the bottom layer. The organic phase collects in weir 48 and is pumped through lines 49, 50 and 51 to mixer 22. This organic phase is a copper-rich organic solution (which can be referred to as a loaded organic). This copper-rich organic solution generally has a copper concentration in the range of about 1 to about 6 grams per liter of extractant in the organic solution, and in one embodiment about 2 to about 4 grams per liter of extractant in the organic solution.

The copper-rich organic solution is mixed in mixer 22 with a copper-depleted stripping solution. The copper-depleted stripping solution (which can be referred to as a lean electrolyte) is produced in the electrolytic cell 124 and is pumped through lines 160, 162, 164, 166, 58 and 60 to mixer 22. This copper-depleted stripping solution has a free sulfuric acid concentration generally in the range of about 80 to about 300 grams per liter, and in one embodiment about 150 to about 250 grams per liter; and a copper ion concentration generally in the range of about 1 to about 50 grams per liter, and in one embodiment about 4 to about 12 grams per liter. Fresh stripping solution make-up can be added to line 60 through line 62. The copper-rich organic solution and copper-depleted stripping solution are mixed in mixer 22 with the result being the formation of an organic phase intermixed with an aqueous phase. Copper ions transfer from the aqueous phase to the organic phase. The mixture is pumped from mixer 22 through line 63 to settler 16. In settler 16, the organic phase separates from the aqueous phase with the organic phase collecting in weir 64. This organic phase is a copper-depleted organic solution (which is sometimes referred to as a barren organic). This copper-depleted organic solution has a copper concentration generally in the range of about 0.5 to about 2 grams per liter of extractant in the organic solution, and in one embodiment about 0.9 to about 1.5 grams per liter of extractant in the organic solution. The copper depleted organic solution is pumped from settler 16 through lines 65, 66, 68 and 70 to mixer 18. Fresh organic solution make-up can be added to line 70 through line 72.

Copper-containing aqueous leach solution is pumped from settler 14 through lines 73, 74, 75 and 76 to mixer 18. This copper-containing aqueous leach solution generally has a copper ion concentration in the range of about 0.4 to about 4 grams per liter, and in one embodiment about 0.5 to about 2.4 grams per liter; and a free sulfuric acid concentration generally in the range of about 5 to about 50 grams per liter, and in one embodiment about 5 to about 30 grams per liter, and in one embodiment about 10 to about 20 grams per liter. In mixer 18, an organic phase and aqueous phase form, intermix and copper ions transfer from the aqueous phase to the organic phase. The mixture is pumped through line 77 to settler 15. In settler 15, the organic phase separates from the aqueous phase with the organic phase collecting in weir 78. This organic phase, which is a copper-containing organic solution, is pumped from settler 15 through lines 79, 80 and 42 to mixer 20. This copper-containing organic solution has a copper concentration generally in the range of about 0.5 to about 4 grams per liter of extractant in the organic solution, and in one embodiment about 1 to about 2.4 grams per liter of extractant in the organic solution. The aqueous phase in settler 15 is a copper-depleted aqueous leaching solution which is pumped through lines 81 and 82 to line 40 wherein it is sprayed over the leach dump 10. Fresh leaching solution make-up can be added to line 82 through line 83.

The aqueous phase which separates out in settler 16 is a copper-rich stripping solution. It is pumped from settler 16 through lines 85 and 86 to filter 132 and from filter 132 through lines 87 and 88 to electrolytic cell 124. This copper-rich stripping solution has a copper ion concentration generally in the range of about 1 to about 60 grams per liter, and in one embodiment about 5 to about 15 grams per liter; and a free sulfuric acid concentration generally in the range of about 70 to about 290 grams per liter, and in one embodiment about 140 to about 240 grams per liter. The copper-rich stripping solution entering electrolytic cell 124 can be referred to as an electrolyte solution 125.

Electrolyte solution 125 has a copper ion concentration generally in the range of about 1 to about 60 grams per liter, and in one embodiment about 4 to about 15 grams per liter; and a free sulfuric acid concentration generally in the range of about 70 to about 300, and in one embodiment about 140 to about 250 grams per liter. The electrolyte solution 125 flows by natural convection between interleaved cathodes 126 and anodes 128. When voltage is applied between the anodes 128 and cathodes 126, electrodeposition of copper metal powder occurs on the cathodes. The electrodeposited copper powder 129 is removed from the cathodes 126 using a mechanical scraper (not shown in the drawing) and is conveyed along endless belt 130 to rinse and dewater unit 134.

The electrolyte solution 125 is converted to a copper-depleted electrolyte solution in electrolytic cell 124 and is withdrawn from cell 124 through line 160. The copper-depleted electrolyte solution in line 160 has a copper ion concentration generally in the range of about 1 to about 50 grams per liter, and in one embodiment about 4 to about 12 grams per liter; and a free sulfuric acid concentration generally in the range of about 80 to about 300, and in one embodiment about 150 to about 250 grams per liter. This copper-depleted electrolyte is either: (1) recirculated through lines 160, 170, 171 and 88 back to cell 124; or (2) pumped through lines 160, 162, 164, 166, 58 and 60 to mixer 22 as the copper-depleted stripping solution.

Copper metal powder 129 is conveyed from electrolytic cell 124 to rinse and dewater unit 134 along endless belt 130. The powder 129 is rinsed and dewatered in unit 134. Rinse and dewater unit 134 can be, for example, a vacuum belt filter equipped with overhead spray nozzles for spraying the powder with water. The powder 129 is conveyed from unit 134 along endless belt 130 to chute 135 and into storage hopper 136. The powder 129 is conveyed from storage hopper 136 through powder spreading weir 145 to endless belt 146. The powder 129 is spread on endless belt 146 and advanced through furnace 148 and cooling chamber 150 where it is dried and sintered to form a sinter cake. During this drying and sintering step, oxides that are picked up in the rinsing and dewatering unit 134 are reduced or eliminated. The sinter cake is conveyed from cooling chamber 150 along endless belt 146 to sinter cake breaker 152 and then advanced to extruder 154. The broken sinter cake is extruded in extruder 154 to form copper rod or wire 155. Copper rod or wire 155 is drawn through die 156 to form copper wire 12 having a desired cross-section which, in one embodiment, is a round cross-section. Copper wire 12 is then coiled on coiler 158.

Although the embodiments depicted in FIGS. 1 and 2 employ two-stage solvent extraction steps using mixers 18 and 20 and settlers 14 and 15, it is to be understood that additional extraction stages can be added to the process without departing from the essence of the invention. Thus, for example, while FIGS. 1 and 2 specifically discloses two-stage extraction steps, and the foregoing discussion refers to single-stage and two-stage extractions, the inventive process can be conducted using a three-stage, four-stage, five-stage, six-stage, etc., extraction step. Similarly, although the embodiments depicted in FIGS. 1 and 2 employ single-stage stripping steps using mixer 22 and settler 16, it is to be understood that additional stripping stages can be added to the process without departing from the essence of the invention. Thus, for example, the inventive process can be conducted using a two-stage, three-stage, four-stage, five-stage, six-stage, etc., stripping step.

The following examples are provided for purposes of illustrating the invention. Unless otherwise indicated, in the following examples as well as throughout the specification and claims, all parts and percentages are by weight, all temperatures are in degrees Celsius, and all pressures are atmospheric.

EXAMPLE 1

Copper wire is prepared using the process illustrated in FIG. 1. The aqueous leaching solution sprayed onto the leach dump 10 from line 40 is a sulfuric acid solution having a sulfuric acid concentration of 20 grams per liter. The copper-rich aqueous leach solution that is pumped to mixer 20 through line 41 has a copper ion concentration of 1.8 grams per liter and a free sulfuric acid concentration of 12 grams per liter. The organic solution is a 7% by weight solution of LIX 984 in SX-7. The concentration of copper in the copper-bearing organic solution that is added to mixer 20 from settler 15 has a copper concentration of 1.95 grams per liter. The copper-rich organic solution that is pumped to mixer 22 from settler 14 has a copper concentration of 3 grams per liter of LIX 984. The copper-depleted stripping solution added to mixer 22 from line 60 has a free sulfuric acid concentration of 170 grams per liter and a copper ion concentration of 40 grams per liter. The copper-depleted organic solution that is pumped from settler 16 to mixer 18 has a copper concentration of 1.25 grams per liter of LIX 984. The copper-containing aqueous leach solution pumped from settler 14 to mixer 18 has a copper ion concentration of 0.8 grams per liter and a free sulfuric acid concentration of 12 grams per liter. The copper-depleted aqueous solution pumped from settler 15 through line 81 has a copper concentration of 0.15 grams per liter and a free sulfuric acid concentration of 12 grams per liter. The copper-rich stripping solution taken from settler 16 has a copper ion concentration of 50 grams per liter and a free sulfuric acid concentration of 160 grams per liter. 140 gallons of this copper-rich stripping solution are recirculated through a mixer/settler at a rate of 2 gallons per minute (gpm). A fresh stream of copper-rich organic solution having a copper concentration of 3 grams per liter of LIX 984 in the solution is added to the mixer, also at a rate of 2 gpm. Sulfuric acid is added as needed to ensure acceptable stripping kinetics. The temperature of the copper-rich stripping solution is maintained at or above 37.8° C. to prevent crystallization of copper sulfate. The final electrolyte solution produced from this procedure has a copper ion concentration of 92 grams per liter and a free sulfuric acid concentration of 83 grams per liter. Copper foil is produced in electroforming cell 24 having a nominal weight of 6 ounce per square foot using a current density of 600 amps per square foot (ASF), a temperature of 150° C., and an electrolyte velocity in the space 27 of 200 cm/sec. Thiourea is added to the electrolyte in cell 24 at a concentration of 0.1 ppm, and the electrolyte has a chloride ion concentration of less than 5 ppm. The foil is slit into a strand or wire having a cross-section of 0.014×0.008 inch using slitter 100. The slit wire is then subjected to two rolling passes in turks head 102. In the first pass, the cross-section is rolled to 0.0112×0.0085 inch. In the second pass, the strip is rolled to a square cross-section having the dimensions of 0.0089×0.0089 inch. This wire is then drawn through die 104 to provide it with a round cross-section and a cross-sectional diameter of 0.00893 inch.

EXAMPLE 2

Copper wire is prepared using the process illustrated in FIG. 2. The aqueous leaching solution sprayed onto the leach dump 10 from line 40 is an aqueous sulfuric acid solution having a free sulfuric acid concentration of 20 grams per liter. The copper-rich aqueous leach solution that is pumped to mixer 20 through line 41 has a copper ion concentration of 1.8 grams per liter and a free sulfuric acid concentration of 12 grams per liter. The organic solution is a 7% by weight solution of LIX 984 in SX-7. The concentration of copper in the copper-bearing organic solution that is added to mixer 20 from settler 15 has a copper concentration of 1.95 grams per liter of LIX 984 in the organic solution. The copper-rich organic solution that is pumped to mixer 22 from settler 14 has a copper concentration of 3 grams per liter of LIX 984 in the organic solution. The copper-depleted stripping solution added to mixer 22 from line 60 has a free sulfuric acid concentration of 170 grams per liter and a copper ion concentration of 40 grams per liter. The copper-depleted organic solution that is pumped from settler 16 to mixer 18 has a copper concentration of 1.25 grams per liter of LIX 984 in the organic solution. The copper-containing aqueous leach solution pumped from settler 14 to mixer 18 has a copper ion concentration of 0.8 grams per liter and a free sulfuric acid concentration of 12 grams per liter. The copper-depleted aqueous solution pumped from settler 15 through line 81 has a copper concentration of 0.15 grams per liter and a free sulfuric acid concentration of 12 grams per liter. The copper-rich stripping solution taken from settler 16 for use in the electrolytic cell is diluted with water and sulfuric acid to provide a copper ion concentration of 8 grams per liter and free sulfuric acid concentration of 145 grams per liter. The current density in the electrolytic cell is 100 ASF, and the temperature is 50° C. The insoluble anodes are made of iridium coated titanium and the cathodes are made of stainless steel. Electrodeposition is conducted in the electrolytic cell for a cycle of 120 minutes. At the end of the cycle, the cathode is scraped using a stainless steel scraper. The copper metal powder is collected in a stainless steel container. The powder is rinsed using deionized water and then the water is decant. This rinse procedure is repeated four more times. The powder is dried and deoxidized at 400° C. for 90 minutes under a hydrogen atmosphere. The powder is extruded to form a copper rod having a round cross-section and a cross-sectional diameter of 1 min. The copper rod is drawn through a polycrystalline diamond die to provide a copper wire with a round cross-section and a cross-sectional diameter of 0.4 mm.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fail within the scope of the appended claims.

We claim:

1. A process for making copper wire directly from a copper-bearing material, comprising:

(A) contacting said copper-bearing material with an effective amount of at least one aqueous leaching solution to dissolve copper ions into said leaching solution and form a copper-rich aqueous leaching solution;

(B) contacting said copper-rich aqueous leaching solution with an effective amount of at least one water-insoluble extractant to transfer copper ions from said copper-rich aqueous leaching solution to said extractant to form a copper-rich extractant and a copper-depleted aqueous leaching solution;

(C) separating said copper-rich extractant from said copper-depleted aqueous leaching solution;

(D) contacting said copper-rich extractant with an effective amount of at least one aqueous stripping solution to transfer copper ions from said extractant to said stripping solution to form a copper-rich stripping solution and a copper-depleted extractant;

(E) separating said copper-rich stripping solution from said copper-depleted extractant;

(F) flowing said copper-rich stripping solution between an anode and a cathode, and applying an effective amount of voltage across said anode and said cathode to deposit copper on said cathode;

(G) removing said copper from said cathode; and (H) converting said removed copper from (G) to copper wire at a temperature below the melting point of said copper.

2. The process of claim 1 wherein said copper that is removed from said cathode during (G) is in the form of copper foil, and (H) comprises:

(H-1) slitting said copper foil into a plurality of strands of copper wire; and (H-2) shaping said strands of copper wire from (H-1) to provide said strands with desired cross-sections.

3. The process of claim 1 wherein said copper that is removed from said cathode during (G) is in the form of copper powder, and (H) comprises:

(H-1) extruding said copper powder to form copper rod or wire; and (H-2) drawing said copper rod or wire from (H-1) to form copper wire of desired cross-section.

4. The process of claim 1 wherein during step (G) said copper while on said cathode is score cut to form a thin strand of copper which is removed from said cathode, and during step (H) said thin strand of copper is shaped to form copper wire of desired cross-section.

5. The process of claim 1 wherein said copper-beating material is copper ore, copper concentrate, copper smelter products, smelter flue dust, copper cement, copper sulfate or copper-containing waste.

6. The process of claim 1 further comprising the step of separating said copper-rich aqueous solution formed in (A) from said copper-bearing material.

7. The process of claim 1 wherein said aqueous leaching solution comprises sulfuric acid, halide acid or ammonia.

8. The process of claim 1 wherein said extractant in (B) is dissolved in an organic solvent selected from the group consisting of kerosene, benzene, naphthalene, fuel oil and diesel fuel.

9. The process of claim 1 wherein said extractant in (B) comprises at least one compound represented by the formula

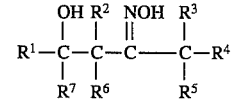

wherein $R^1$, $R^2$, $R^3$, $R^4$, $R^5$, $R^6$ and $R^7$ are independently hydrogen or hydrocarbyl groups.

10. The process of claim 1 wherein said extractant in (B) comprises at least one compound represented by the formula

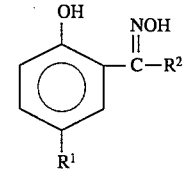

wherein $R^1$ and $R^2$ are independently hydrogen or hydrocarbyl groups.

11. The process of claim 1 wherein said extractant in (B) comprises at least one compound represented by the formula

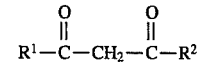

wherein $R^1$ and $R^2$ are independently alkyl groups or aryl groups.

12. The process of claim 1 wherein said extractant in (B) comprises at least one ion exchange resin.

13. The process of claim 12 wherein said ion exchange resin is a copolymer of styrene and divinylbenzene characterized by the presence of at least one functional group selected from $—SO_3^{13}$, $—COO^-$,

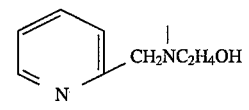

and

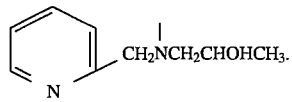

14. The process of claim 12 wherein said ion exchange resin is a copolymer of styrene and divinylbenzene.

15. The process of claim 1 wherein said stripping solution comprises sulfuric acid.

16. The process of claim 1 wherein said copper that is removed during (G) is in the form of copper foil or copper wire, and during (F) said copper-rich stripping solution has a copper ion concentration in the range of about 40 to about 150 grams per liter and a free sulfuric acid concentration in the range of about 70 to about 170 grams per liter.

17. The process of claim 1 wherein said copper that is removed during (G) is in the form of copper foil or copper wire, and prior to or during (F) at least one active-sulfur containing material or at least one gelatin is added to said copper-rich stripping solution.

18. The process of claim 1 wherein said copper that is removed during (G) is in the form of copper foil or copper wire, and prior to or during (F) at least one additive selected from the group consisting of molasses, guar gum, polyethylene glycol, polypropylene glycol, polyisopropylene glycol, dithiothreitol, proline, hydroxyproline, cysteine, acrylamide, sulfopropyl disulfide, tetraethylthiuram disulfide, benzyl chloride, epichlorohydrin, chlorohydroxylpropylsulfonate, ethylene oxide, propylene oxide, sulfonium alkane sulfonate, thiocarbamoyldisulfide and selenic acid is added to said copper-rich stripping solution.

19. The process of claim 1 wherein said copper that is removed during (G) is in the form of copper foil or copper wire, and $I/I_L$ during (F) is about 0.4 or less.

20. The process of claim 1 wherein said copper that is removed during (G) is in the form of copper powder, and during (F) said copper-rich stripping solution has a copper ion concentration in the range of about 1 to about 60 grams per liter and a free sulfuric acid concentration in the range of about 70 to about 300 grams per liter.

21. The process of claim 1 wherein said copper that is removed during (G) is in the form of copper powder, and prior to or during (F) at least one additive selected from the group consisting of gelatin, benzotriazole, thiourea, chloride ions, sodium sulfate, and one or more sulfonates is added to said copper-rich stripping solution.

22. The process of claim 1 wherein said copper that is removed during (G) is in the form of copper powder, and $I/I_L$ during (F) is about 0.8 or greater.

23. A process for making copper wire directly from a copper-beating material, comprising:

(A) contacting said copper-bearing material with an effective amount of at least one aqueous leaching solution to dissolve copper ions in said leaching solution and form a copper-rich aqueous leaching solution;

(B-1) contacting said copper-rich aqueous leaching solution from (A) with an effective amount of at least one copper-beating water-insoluble extractant from (C-2) to transfer copper ions from said copper-rich aqueous leaching solution to said copper-bearing extractant to form a copper-rich extractant and a first copper-depleted aqueous leaching solution;

(C-1) separating said copper-rich extractant from said first copper-depleted aqueous leaching solution, advancing said copper-rich extractant to (D);

(B-2) contacting said first copper-depleted aqueous leaching solution from (C-1) with an effective amount of at least one copper-depleted extractant from (E) to transfer copper ions from said first copper-depleted aqueous leaching solution to said copper-depleted extractant to form a copper-bearing extractant and a second copper-depleted aqueous leaching solution;

(C-2) separating said copper-bearing extractant from said second copper-depleted aqueous leaching solution, recirculating said copper-bearing extractant to (B-1);

(D) contacting said copper-rich extractant from (C-1) with an effective amount of at least one aqueous stripping solution to transfer copper ions from said copper-rich extractant to said stripping solution to form a first electrolyte solution and a copper-depleted extractant;

(E) separating said first electrolyte solution from said copper-depleted extractant, recirculating said copper-depleted extractant to (B-2);

(F) advancing said first electrolyte solution to an electrolytic cell equipped with at least one anode and at least one rotating cathode, and applying an effective amount of voltage across said anode and said cathode to deposit copper on said cathode in the form of copper foil;

(G) removing said copper foil from said cathode;

(H-1) slitting said copper foil into a plurality of strands of copper wire; and (H-2) shaping said strands of copper wire from (H-1) to provide said strands with desired cross-sections.

24. A process for making copper wire directly from a copper-bearing material, comprising:

(A) contacting said copper-bearing material with an effective amount of at least one aqueous leaching solution to dissolve copper ions in said leaching solution and form a copper-rich aqueous leaching solution;

(B-1) contacting said copper-rich aqueous leaching solution from (A) with an effective amount of at least one copper-bearing water-insoluble extractant from (C-2) to transfer copper ions from said copper-rich aqueous leaching solution to said copper-bearing extractant to form a copper-rich extractant and a first copper-depleted aqueous leaching solution;

(C-1) separating said copper-rich extractant from said first copper-depleted aqueous leaching solution, advancing said copper-rich extractant to (D);

(B-2) contacting said first copper-depleted aqueous leaching solution from (C-1) with an effective amount of at least one copper-depleted extractant from (E) to transfer copper ions from said first copper-depleted aqueous leaching solution to said copper-depleted extractant to form a copper-bearing extractant and a second copper-depleted aqueous leaching solution;

(C-2) separating said copper-bearing extractant from said second copper-depleted aqueous leaching solution, recirculating said copper-beating extractant to (B-1);

(D) contacting said copper-rich extractant from (C-1) with an effective amount of at least one aqueous stripping solution to transfer copper ions from said copper-rich extractant to said stripping solution to form a first electrolyte solution and a copper-depleted extractant;

(E) separating said first electrolyte solution from said copper-depleted extractant, recirculating said copper-depleted extractant to (B-2);

(F) advancing said first electrolyte solution from (E) to an electrolytic cell equipped with at least one first anode and at least one cathode, and applying an effective amount of voltage across said anode and said cathode to deposit copper on said first cathode;

(G) removing copper powder from said cathode;

(H-1) extruding said copper powder to form copper rod or wire; and (H-2) drawing said copper rod or wire from (H-1) to form copper wire with a desired cross-section.

25. A process for making copper wire directly from a copper-bearing material, comprising:

(A) contacting said copper-bearing material with an effective amount of at least one aqueous leaching solution to dissolve copper ions in said leaching solution and form a copper-rich aqueous leaching solution;

(B-1) contacting said copper-rich aqueous leaching solution from (A) with an effective amount of at least one copper-bearing water-insoluble extractant from (C-2) to transfer copper ions from said copper-rich aqueous leaching solution to said copper-bearing extractant to form a copper-rich extractant and a first copper-depleted aqueous leaching solution;

(C-1) separating said copper-rich extractant from said first copper-depleted aqueous leaching solution, advancing said copper-rich extractant to (D);

(B-2) contacting said first copper-depleted aqueous leaching solution from (C-1) with an effective amount of at least one copper-depleted extractant from (E) to transfer copper ions from said first copper-depleted aqueous leaching solution to said copper-depleted extractant to form a copper-bearing extractant and a second copper-depleted aqueous leaching solution;

(C-2) separating said copper-bearing extractant from said second copper-depleted aqueous leaching solution, recirculating said copper-bearing extractant to (B-1);

(D) contacting said copper-rich extractant from (C-1) with an effective amount of at least one aqueous stripping solution to transfer copper ions from said copper-rich extractant to said stripping solution to form a first electrolyte solution and a copper-depleted extractant;

(E) separating said first electrolyte solution from said copper-depleted extractant, recirculating said copper-depleted extractant to (B-2);

(F) advancing said first electrolyte solution from (E) into an electrolytic cell equipped with at least one anode and at least one rotating cathode, and applying an effective amount of voltage across said anode and said cathode to deposit copper on said cathode;

(G) score-cutting said copper to form a thin strand of copper and removing said strand of copper from said cathode; and (H-1) shaping said strand of copper from (G) to provide copper wire with a desired cross-section.

26. A process for making copper wire directly from a copper-bearing material, comprising:

(A) contacting said copper-bearing material with an effective amount of at least one aqueous leaching solution to dissolve copper ions in said leaching solution and form a copper-rich aqueous leaching solution;

(B-1) contacting said copper-rich aqueous leaching solution from (A) with an effective amount of at least one copper-bearing water-insoluble extractant from (C-2) to transfer copper ions from said copper-rich aqueous leaching solution to said copper-bearing extractant to form a copper-rich extractant and a first copper-depleted aqueous leaching solution;

(C-1) separating said copper-rich extractant from said first copper-depleted aqueous leaching solution, advancing said copper-rich extractant to (D);

(B-2) contacting said first copper-depleted aqueous leaching solution from (C-1) with an effective amount of at least one copper-depleted extractant from (E) to transfer copper ions from said first copper-depleted aqueous leaching solution to said copper-depleted extractant to form a copper-bearing extractant and a second copper-depleted aqueous leaching solution;

(C-2) separating said copper-bearing extractant from said second copper-depleted aqueous leaching solution, recirculating said copper-bearing extractant to (B-1);

(D) contacting said copper-rich extractant from (C-1) with an effective amount of at least one aqueous stripping solution to transfer copper ions from said copper-rich extractant to said stripping solution to form a first electrolyte solution and a copper-depleted extractant;

(E) separating said first electrolyte solution from said copper-depleted extractant, recirculating said copper-depleted extractant to (B-2);

(F) advancing said first electrolyte solution to an electrolytic cell equipped with at least one anode and at least one rotating cathode, and applying an effective amount of voltage across said anode and said cathode to deposit copper on said cathode;

(G) removing said copper from said cathode; and (H) converting said removed copper from (G) to copper wire at a temperature below the melting point of said copper.

27. The process of claim 26 wherein said copper-bearing material is copper ore, copper concentrate, copper smelter products, smelter flue dust, copper cement, copper sulfate or copper-containing waste.

28. The process of claim 26 with the step of separating said copper-rich aqueous solution formed in (A) from said copper-bearing material.

29. The process of claim 26 wherein said aqueous leaching solution comprises sulfuric acid, halide acid or ammonia.

30. The process of claim 26 wherein said extractant is dissolved in an organic solvent selected from the group consisting of kerosene, benzene, naphthalene, fuel oil and diesel fuel.

31. The process of claim 26 wherein said extractant comprises at least one compound represented by the formula $$R^1-\underset{\underset{R^7}{|}}{\overset{\overset{OH}{|}}{C}}-\underset{\underset{R^6}{|}}{\overset{\overset{R^2}{|}}{C}}-\overset{\overset{NOH}{\|}}{C}-\overset{\overset{R^3}{|}}{\underset{\underset{R^5}{|}}{C}}-R^4$$

wherein $R^1$, $R^2$, $R^3$, $R^4$, $R^5$, $R^6$ and $R^7$ are independently hydrogen or hydrocarbyl groups.

32. The process of claim 26 wherein said extractant comprises at least one compound represented by the formula

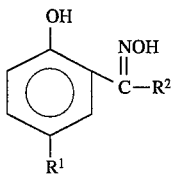

wherein $R^1$ and $R^2$ are independently hydrogen or hydrocarbyl groups.

33. The process of claim 26 wherein said extractant comprises at least one compound represented by the formula

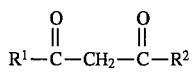

wherein $R^1$ and $R^2$ are independently alkyl groups or aryl groups.

34. The process of claim 26 wherein said extractant comprises at least one ion exchange resin.

35. The process of claim 34 wherein said ion exchange resin is a copolymer of styrene and divinylbenzene characterized by the presence of at least one functional group selected from —$SO_3^-$, —$COO^-$,

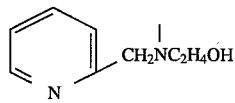

and

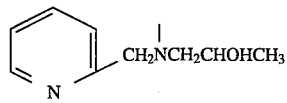

36. The process of claim 34 wherein said ion exchange resin is a copolymer of styrene and divinylbenzene.

37. The process of claim 26 wherein said stripping solution comprises sulfuric acid.

38. The process of claim 26 wherein said copper that is removed during (G) is in the form of copper foil or copper wire, and during (F) said copper-rich stripping solution has a copper ion concentration in the range of about 40 to about 150 grams per liter and a free sulfuric acid concentration in the range of about 70 to about 170 grams per liter.

39. The process of claim 26 wherein said copper that is removed during (G) is in the form of copper foil or copper wire, and prior to or during (F) at least one active-sulfur containing material and/or at least one gelatin is added to said copper-rich stripping solution.

40. The process of claim 26 wherein said copper that is removed during (G) is in the form of copper foil or copper wire, and prior to or during (F) at least one additive selected from the group consisting of molasses, guar gum, polyethylene glycol, polypropylene glycol, polyisopropylene glycol, dithiothreitol, proline, hydroxyproline, cysteine, acrylamide, sulfopropyl disulfide, tetraethylthiuram disulfide, benzyl chloride, epichlorohydrin, chlorohydroxylpropylsulfonate, ethylene oxide, propylene oxide, sulfonium alkane sulfonate, thiocarbamoyldisulfide and selenic acid is added to said copper-rich stripping solution.

41. The process of claim 26 wherein said copper that is removed during (G) is in the form of copper foil or copper wire, and $I/I_L$, during (F) is about 0.4 or less.

42. The process of claim 26 wherein said copper that is removed during (G) is in the form of copper powder, and during (F) said copper-rich stripping solution has a copper ion concentration in the range of about 1 to about 60 grams per liter and a free sulfuric acid concentration in the range of about 70 to about 300 grams per liter.

43. The process of claim 26 wherein said copper that is removed during (G) is in the form of copper powder, and prior to or during (F) at least one additive selected from the group consisting of gelatin, benzotriazole, thiourea, chloride ions, sodium sulfate, and one or more sulfonates is added to said copper-rich stripping solution.

44. The process of claim 26 wherein said copper that is removed during (G) is in the form of copper powder, and $I/I_L$, during (F) is about 0.8 or greater.

* * * * *